United States Patent
Hwang et al.

(10) Patent No.: US 11,317,309 B2
(45) Date of Patent: Apr. 26, 2022

(54) METHOD AND APPARATUS FOR MEASUREMENT REPORTING IN WIRELESS COMMUNICATION SYSTEM

(71) Applicant: Samsung Electronics Co., Ltd., Suwon-si (KR)

(72) Inventors: June Hwang, Suwon-si (KR); Soenghun Kim, Suwon-si (KR); Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 16/790,080

(22) Filed: Feb. 13, 2020

(65) Prior Publication Data
US 2020/0267586 A1   Aug. 20, 2020

(30) Foreign Application Priority Data
Feb. 14, 2019 (KR) ........................ 10-2019-0017262

(51) Int. Cl.
*H04W 24/10* (2009.01)
*H04B 17/318* (2015.01)
*H04W 24/08* (2009.01)

(52) U.S. Cl.
CPC .......... *H04W 24/10* (2013.01); *H04B 17/318* (2015.01); *H04W 24/08* (2013.01)

(58) Field of Classification Search
CPC ..................................................... H04L 12/28

USPC ......................................................... 370/329
See application file for complete search history.

(56) References Cited

U.S. PATENT DOCUMENTS

| | | |
|---|---|---|
| 2013/0208601 A1 | 8/2013 | Cui et al. |
| 2016/0234710 A1 | 8/2016 | Jung et al. |
| 2016/0285679 A1 | 9/2016 | Dudda et al. |
| 2018/0102817 A1* | 4/2018 | Park ........................ H04B 7/06 |
| 2018/0255473 A1 | 9/2018 | Kim et al. |

FOREIGN PATENT DOCUMENTS

KR    10-2016-0059478 A    5/2016

OTHER PUBLICATIONS

3GPP; TSG RAN; NR; RRC protocol specification (release 15), 3GPP TS 38.331 V15.4.0, Jan. 14, 2019, sections 5.5.1, 5.5.4.1, 5.5.5.1.

(Continued)

*Primary Examiner* — Dang T Ton
(74) *Attorney, Agent, or Firm* — Jefferson IP Law, LLP

(57) ABSTRACT

A communication method and system are provided for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method for efficiently measuring the strength of a signal in a wireless communication system is provided.

20 Claims, 20 Drawing Sheets

(56) References Cited

OTHER PUBLICATIONS

Spreadtrum Communications, 'Correction to inter-RAT measurement for NR', R2-1817335, 3GPP TSG-RAN WG2, Meeting #104, Spokane, USA, Nov. 2, 2018, section 5.5.5.1.
International Search Report dated May 7, 2020, issued in International Application No. PCT/KR2020/002092.
Huawei et al. "CR on 38.331 for reporting of E-UTRA measurements in NE-DC", 3GPP DRAFT; R2-1817373 CR on 38.331 for Reporting of E-UTRA Measurements in NE-DC, 3rd Generation Partnership Project (3GPP), Mobile Cempetence Centre; 650, Route des Lucioles; F-06921 Sophia-Antipolis Cedex, France, vol. RAN WG2, No. Spokane, US; Nov. 12, 2018-Nov. 16, 2018, (Nov. 12, 2018), XP051556906, Nov. 12, 2018.
European Search Report dated Feb. 4, 2022, issued in European Application No. 20756317.2.

\* cited by examiner

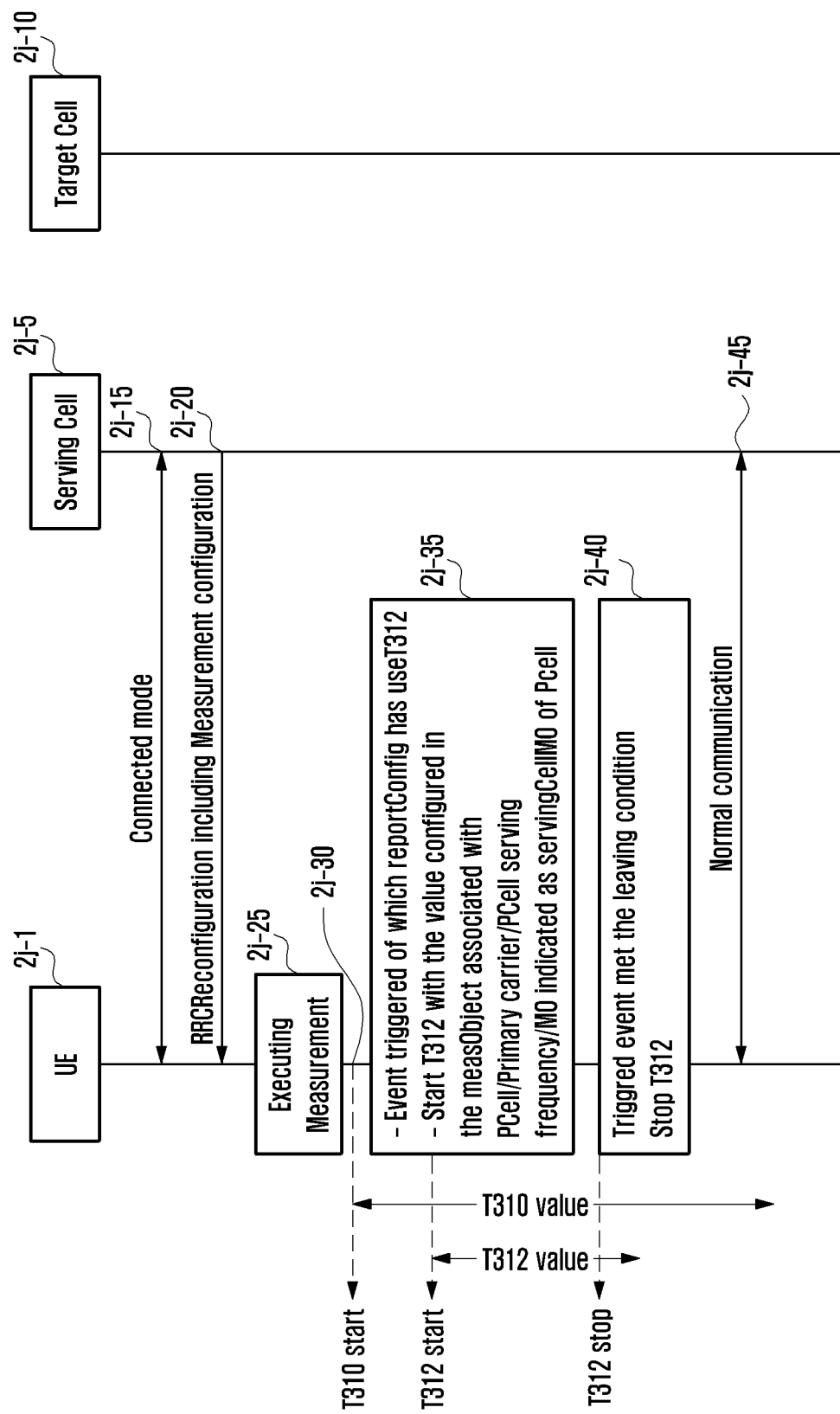

METHOD AND APPARATUS FOR MEASUREMENT REPORTING IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0017262, filed on Feb. 14, 2019, in the Korean Intellectual Property Office, the disclosure of which is incorporated by reference herein in its entirety.

BACKGROUND

1. Field

The disclosure relates to a method for measuring the strength of a signal in a wireless communication system. More particularly, the disclosure relates to a method for quickly recovering from failure by using a timer in a wireless communication system.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Since various services can be provided with the advance of wireless communication systems as described above, schemes for efficiently providing these services are needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for efficiently measuring the strength of a signal in a wireless communication system.

Another aspect of the disclosure is to provide a method for quickly recovering from failure by using a timer in a wireless communication system.

Additional aspects will be set forth in part in the description which follows and, in part, will be apparent from the description, or may be learned by practice of the presented embodiments.

In accordance with an aspect of the disclosure, in a case where a base station transmits a signal strength measurement configuration to a terminal, if a condition of the given configuration is satisfied, the terminal transmits the strength of a serving cell and the strength of a neighboring cell, wherein the strength transmission is not for all the neighboring cells, and is limitedly performed for a neighboring cell existing in a frequency of the serving cell for which a serving cell measurement object is configured.

In accordance with another aspect of the disclosure, in a case where a terminal has operated a wireless connection signal timer through strength measurement of a downlink signal, if a handover target cell is discovered, the timer is replaced with a short timer value configured for a serving cell, and if a handover operation message has not arrived during the interval, the terminal declares failure immediately.

In accordance with another aspect of the disclosure, at a time of signal strength measurement reporting in a mobile communication system, a serving cell measurement object is limited to only a neighboring cell in a restricted frequency, rather than measuring of the strength of all the possible neighboring cells, whereby the amount of report information generated by sending measurement information of an unnecessary neighboring cell can be reduced.

In accordance with another aspect of the disclosure, in a case where there is an alternative of moving to another cell through a fast failure declaration, an additional serving cell signal strength monitoring time is removed to enable fast failure recovery.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2J illustrates a case of satisfying a leaving condition of an event during a timer T312 operation according to an embodiment of the disclosure.

Throughout the drawings, it should be noted that like reference numbers are used to depict the same or similar elements, features, and structures.

DETAILED DESCRIPTION

Figure 1A:
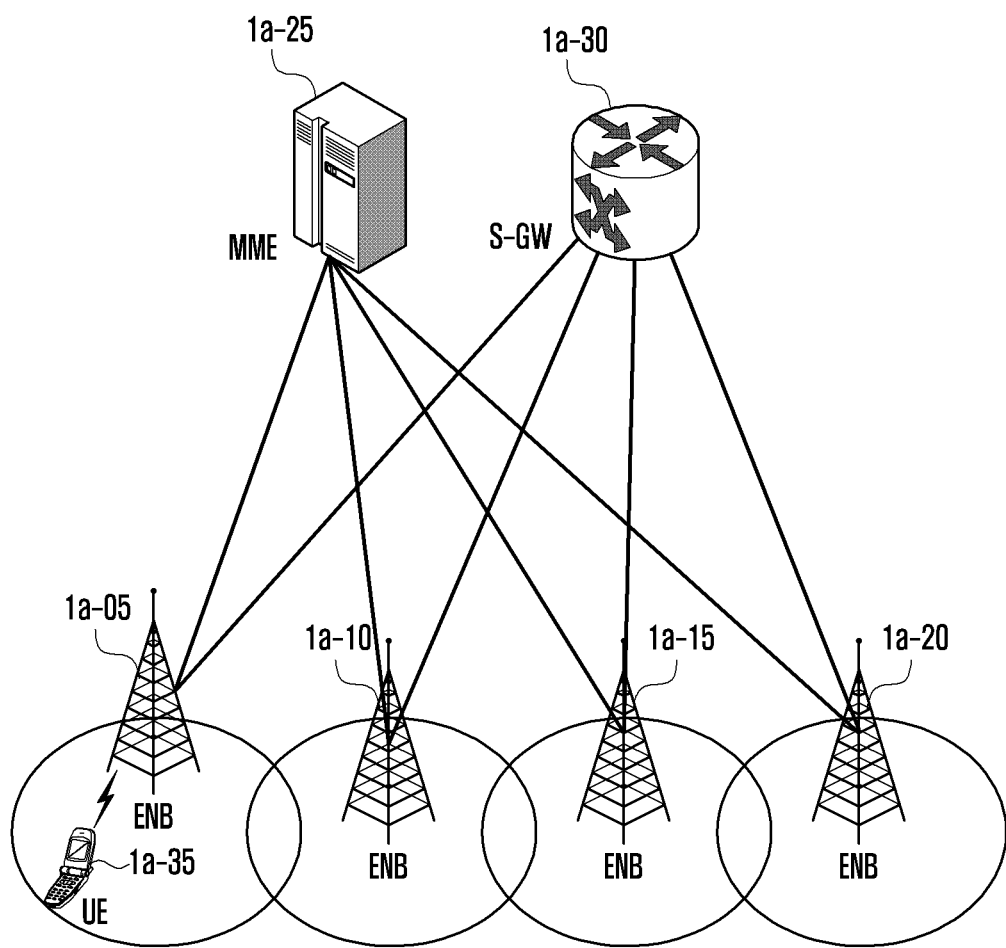
FIG. 1A illustrates a structure of an LTE system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In the following description of the disclosure, a detailed description of known functions or configurations incorporated herein will be omitted when it may make the subject matter of the disclosure rather unclear. Hereinafter, embodiments of the disclosure will be described in detail with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used. For example, in the following description, the term "terminal" may refer to a MAC entity in each terminal that exists for each of a master cell group (MCG) and a secondary cell group (SCG).

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

Hereinafter, a base station is a subject configured to perform resource allocation to a terminal, and may be one of a gNode B, an eNode B, a Node B, a base station (BS), a wireless access unit, a base station controller, or a node on a network. A terminal may include a user equipment (UE), a mobile station (MS), a cellular phone, a smartphone, a computer, or a multimedia system capable of a communication function. However, the disclosure is not limited to the example described above.

Particularly, the disclosure may be applied to 3GPP NR (5th generation mobile communication standard). In addition, the disclosure may be applied to intelligent services (e.g. smart home, smart building, smart city, smart car or connected car, health care, digital education, smart retail, and security and safety services) based on a 5G communication technology and an IoT-related technology. In the disclosure, an eNB may be used together with a gNB for convenience of explanation. That is, a base station described by an eNB may indicate a gNB. In addition, the term "terminal" may indicate other wireless communication devices as well as a mobile phone, NB-IoT devices, and sensors.

A wireless communication system has developed to be a broadband wireless communication system that provides a high speed and high quality packet data service, similar to the communication standards, for example, high speed packet access (HSPA), long term evolution (LTE or evolved universal terrestrial radio access (E-UTRA)), LTE-advanced (LTE-A), and LTE-Pro of 3GPP, high rate packet data (HRPD), and ultra-mobile broadband (UMB) of 3GPP2, 802.16e of IEEE, and the like, beyond the voice-based service provided at the initial stage.

An LTE system, which is a representative example of the broadband wireless communication system, employs an orthogonal frequency division multiplexing (OFDM) scheme for downlink (DL), and employs a single carrier frequency division multiple access (SC-FDMA) scheme for uplink (UL). Uplink denotes a wireless link for transmitting data or a control signal by a terminal (user equipment (UE) or mobile station (MS)) to a base station (eNode B or base station (BS)), and downlink denotes a wireless link for transmitting data or a control signal by a base station to a terminal. In the multiple access schemes described above, time-frequency resources for carrying data or control information are allocated and managed in a manner to prevent overlapping of the resources between users, i.e. to establish the orthogonality, so as to identify data or control information of each user.

A future communication system after LTE, that is, a 5G communication system, is required to freely apply various requirements from a user, a service provider, and the like, and thus support a service satisfying all the various requirements. Services considered for 5G communication systems may include enhanced mobile broadband (eMBB), massive machine type communication (mMTC), ultra-reliability low-latency communication (URLLC), and the like.

According to a part of embodiments, the purpose of eMBB may be to provide a data transfer rate enhanced more than a data transfer rate supported by the conventional LTE, LTE-A, or LTE-Pro. For example, in a 5G communication system, eMBB is required to provide a peak data rate of 10 Gbps for uplink and a peak data rate of 20 Gbps for downlink in view of a single base station. In addition, the 5G communication system is required to provide the peak data rates and an increased user perceived data rate of a terminal. In order to satisfy the requirements described above, a 5G communication system may require the improvement of various transmission/reception technologies including further enhanced multi input multi output (MIMO) transmission technology. In addition, while current LTE uses, for the transmission of a signal, a maximum transmission bandwidth of 20 MHz in a band of 2 GHz used by the LTE, a 5G communication system uses a frequency bandwidth greater than 20 MHz in a frequency band of 3-6 GHz or a frequency band of 6 GHz or greater to satisfy a data transfer rate required for the 5G communication system.

Meanwhile, in a 5G communication system, mMTC has been considered to support application services such as the Internet of Things (IoT). In order to efficiently provide the Internet of Things, mMTC may require the support of massive terminal access in a cell, the improvement of terminal coverage, improved battery life time, terminal cost reduction, etc. Since the Internet of Things is attached to various sensors and devices to provide communication functions, mMTC is required to support a large number of terminals (e.g. 1,000,000 terminals/km2) in a cell. In addition, a terminal supporting mMTC may require a wider coverage compared to other services provided in a 5G communication system because the terminal is highly probable, due to the nature of mMTC, to be disposed in a radio shadow area such as the basement of a building, which a cell fails to cover. A terminal supporting mMTC is required to be inexpensive and have a very long battery life time, for example, 10-15 years, because it is hard to often change the battery of the terminal.

Lastly, URLLC is a cellular-based wireless communication service that is mission-critically used, and services used in remote control for robots or machinery, industrial automation, unmanned aerial vehicles, remote health care, emergency alerts, etc. may be considered for URLLC. Therefore, communication provided by URLLC may be required to provide very low latency (ultra-low latency) and very high reliability (ultra-high reliability). For example, a service supporting URLLC may be required to satisfy a wireless access latency time (air interface latency) smaller than 0.5 milliseconds and a packet error rate of $10^{-5}$ or smaller at the same time. Therefore, for services supporting URLLC, a 5G system may require a design for providing a transmission time interval (TTI) shorter than those of other services and allocating a wide domain of resources in a frequency band to secure the reliability of a communication link.

Three services as described above, that is, eMBB, URLLC, and mMTC, considered for a 5G communication system may be multiplexed and then transmitted in a single system. In order to satisfy different requirements of the services, different transmission/reception schemes and different transmission/reception parameters may be used for the services, respectively. URLLC, mMTC, and eMBB as described above merely correspond to an example of different service types, and service types to which the disclosure may be applied, are not limited to the example.

In addition, hereinafter, an embodiment will be described based on an example of an LTE, LTE-A, LTE Pro, or 5G (or NR, next generation mobile communication) system, but an embodiment may be also applied to another communication system having a similar technical background or channel type. Therefore, an embodiment may be also applied to another communication system through partial modification without departing from the scope of the disclosure as a determination of a person who skilled in the art.

FIG. 1A illustrates a structure of an LTE system according to an embodiment of the disclosure.

Referring to FIG. 1A, as illustrated, a wireless access network of a LTE system may include next generation base stations (an evolved node B, hereinafter, an ENB, a Node B, or a base station) 1a-05, 1a-10, 1a-15, and 1a-20, a mobility management entity (MME) 1a-25, and a serving gateway (S-GW) 1a-30. A user equipment (hereinafter, UE or terminal) 1a-35 may access an external network through the ENBs 1a-05, 1a-10, 1a-15, and 1a-20, and the S-GW 1a-30.

In FIG. 1A, the ENBs 1a-05, 1a-10, 1a-15, and 1a-20 may correspond to a conventional node B in a UMTS system. An ENB may be connected to the UE 1a-35 through a wireless channel and may perform complex functions compared to the conventional node B. In an LTE system, all the user traffics including real-time service such as a voice over IP (VoIP) through an Internet protocol may be serviced through a shared channel Therefore, an LTE system may require a device configured to collect pieces of information including a buffer state, an available transmission power state, and a channel state of UEs, and perform scheduling, and the ENBs 1a-05 to 1a-20 may serve as the device. A single ENB may generally control a plurality of cells. For example, an LTE system may use, as a wireless access technology, for example, an orthogonal frequency division multiplexing (OFDM) scheme in a bandwidth of 20 MHz in order to implement a transfer rate of 100 Mbps. Furthermore, an ENB may employ an adaptive modulation and coding (AMC) scheme for determining a modulation scheme and a channel coding rate according to a channel state of a terminal. The S-GW 1a-30 may be a device configured to provide a data bearer, and may generate or remove a data bearer according to a control of the MME 1a-25. The MME is a device configured to perform various control functions as well as a mobility management function for a terminal, and may be connected to a plurality of base stations.

Figure 1B:
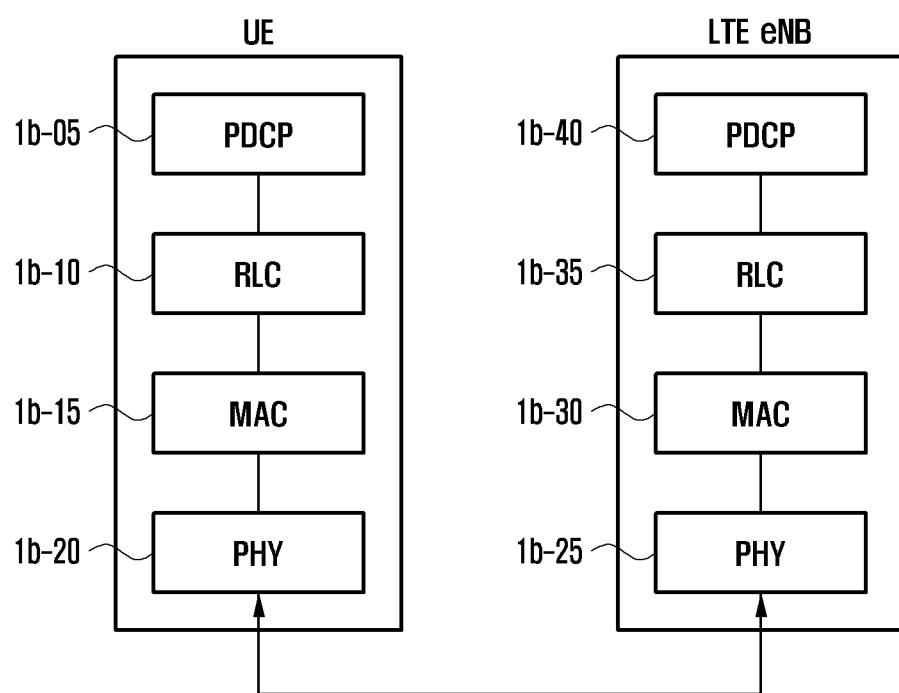
FIG. 1B illustrates a wireless protocol structure of an LTE system according to an embodiment of the disclosure.

FIG. 1B illustrates a wireless protocol structure of an LTE system according to an embodiment of the disclosure.

Referring to FIG. 1B, a wireless protocol of an LTE system may include packet data convergence protocol (PDCP) 1b-05 and 1b-40, radio link controls (RLC) 1b-10 and 1b-35, medium access controls (MAC) 1b-15 and 1b-30 of a terminal and an ENB, respectively. A PDCP may function to perform an operation such as compression/ reconstruction of an IP header. Main functions of a PDCP may be summarized as below. However, the main functions are not limited to an example below.

Header compression and decompression (ROHC only)

Transfer of user data

In-sequence delivery (In-sequence delivery of upper layer PDUs at PDCP re-establishment procedure for RLC AM)

Reordering (For split bearers in DC (only support for RLC AM): PDCP PDU routing for transmission and PDCP PDU reordering for reception)

Duplicate detection (Duplicate detection of lower layer SDUs at PDCP re-establishment procedure for RLC AM)

Retransmission (Retransmission of PDCP SDUs at handover and, for split bearers in DC, of PDCP PDUs at PDCP data-recovery procedure, for RLC AM)

Ciphering and deciphering

Timer-based SDU discard (Timer-based SDU discard in uplink)

According to a part of embodiments, the radio link controls (RLC) 1b-10 and 1b-35 may reconfigure a PDCP packet data unit (PDU) to have a proper size, so as to perform an ARQ operation, and the like. Main functions of an RLC may be summarized as below. However, the main functions are not limited to an example below.

Data transfer (Transfer of upper layer PDUs)

ARQ (Error Correction through ARQ (only for AM data transfer))

Concatenation, segmentation and reassembly (Concatenation, segmentation and reassembly of RLC SDUs (only for UM and AM data transfer))

Re-segmentation (Re-segmentation of RLC data PDUs (only for AM data transfer))

Reordering (Reordering of RLC data PDUs (only for UM and AM data transfer)

Duplicate detection (Duplicate detection (only for UM and AM data transfer))

Error detection (Protocol error detection (only for AM data transfer))

RLC SDU discard (only for UM and AM data transfer)

RLC re-establishment

According to a part of embodiments, the MACs 1b-15 and 1b-30 may be connected to several RLC layer devices configured in a single terminal, may multiplex RLC PDUs to a MAC PDU, and may demultiplex a MAC PDU to RLC PDUs. Main functions of a MAC may be summarized as below. However, the main functions are not limited to an example below.

Mapping (Mapping between logical channels and transport channels)

Multiplexing and demultiplexing (Multiplexing/demultiplexing of MAC SDUs belonging to one or different logical channels into/from transport blocks (TB) delivered to/from the physical layer on transport channels)

Scheduling information reporting

HARQ (Error correction through HARQ)

Priority handling between logical channels (Priority handling between logical channels of one UE)

Priority handling between UEs (Priority handling between UEs by means of dynamic scheduling)

MBMS service identification

Transport format selection

Padding

According to a part of embodiments, physical layers 1b-20 and 1b-25 may perform channel coding and modulation on upper layer data to make the data into an OFDM symbol and transmit the OFDM symbol through a wireless channel, or may demodulate and channel-decode an OFDM symbol received through a wireless channel, and then transfer the OFDM symbol to an upper layer. However, the operation is not limited to an example below.

Figure 1C:
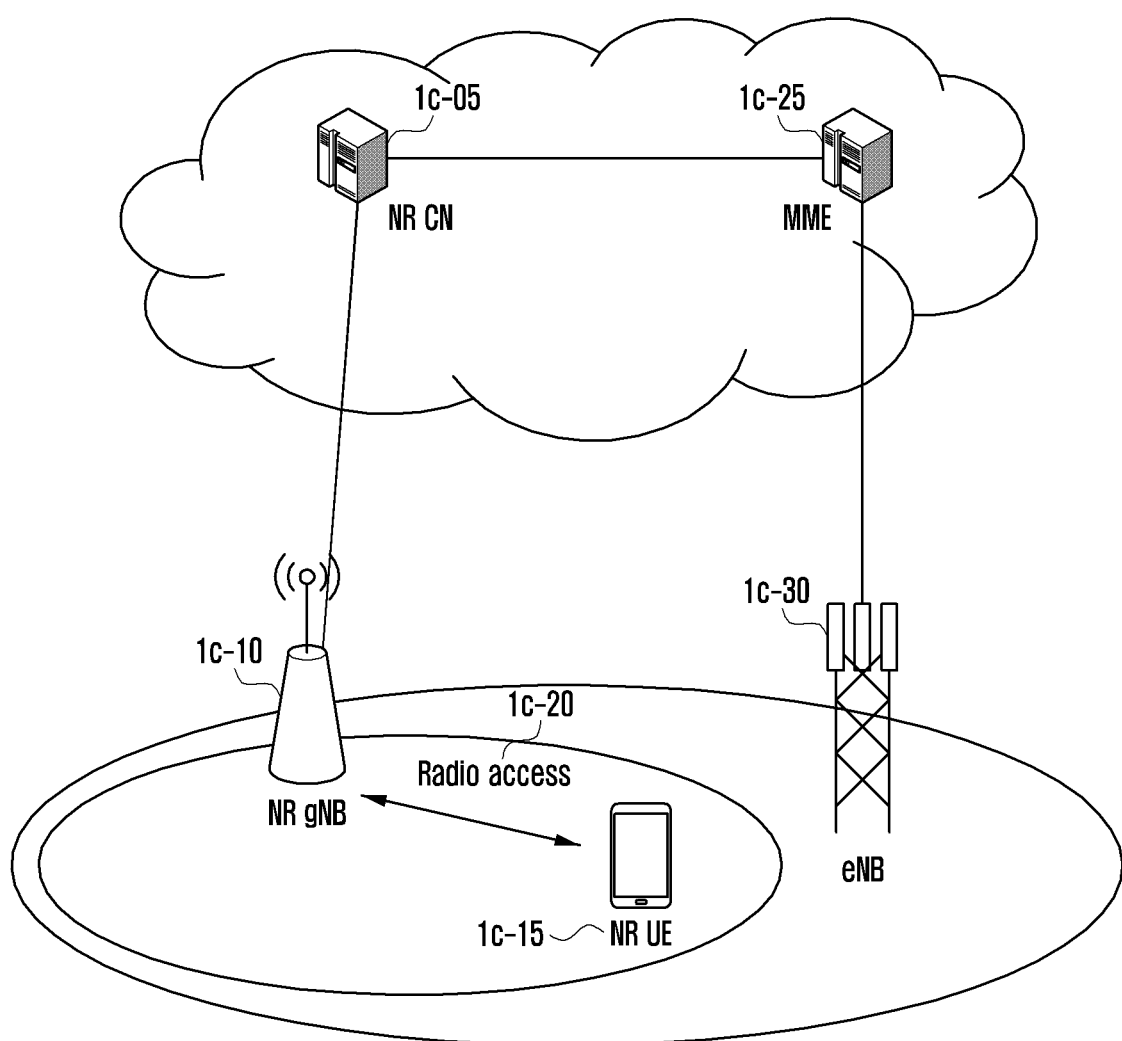
FIG. 1C illustrates a structure of a next generation mobile communication system according to an embodiment of the disclosure.

FIG. 1C illustrates a structure of a next generation mobile communication system according to an embodiment of the disclosure.

Referring to FIG. 1C, a wireless access network of a next generation mobile communication system (hereinafter, NR or 2g) may include a next generation base station (new radio node B, hereinafter, NR gNB or NR base station) 1c-10 and a next generation wireless core network (new radio core network, NR CN) 1c-05. A next generation wireless user equipment (new radio user equipment, NR UE or terminal) 1c-15 may access an external network through the NR gNB 1c-10 and the NR CN 1c-05.

In FIG. 1C, the NR gNB 1c-10 may correspond to an evolved node B (eNB) of a conventional LTE system. The NR gNB 1c-10 is connected to the NR UE 1c-15 through a wireless channel 1c-20 and may provide an outstanding service compared to the conventional node B. In an NR system, all the user traffics may be serviced through a shared channel. Therefore, an NR system may require a device configured to collect state information, such as a buffer state, an available transmission power state, and a channel state of UEs, and perform scheduling, and the NR gNB 1c-10 may serve as the device. A single NR gNB 1c-10 may generally control a plurality of cells. In order to implement ultra-high speed data transfer compared to the current LTE, a NR system may employ a bandwidth larger than or equal to the current maximum bandwidth. In addition, the NR system may use, as a wireless access technology, an orthogonal frequency division multiplexing (OFDM) scheme, and additionally use a beamforming technology.

In addition, according to a part of embodiments, the NR gNB 1c-10 may employ an adaptive modulation and coding (hereinafter, referred to as AMC) scheme for determining a modulation scheme and a channel coding rate according to a channel state of a terminal. The NR CN 1c-05 may perform functions such as mobility support, bearer configuration, and QoS configuration. The NR CN 1c-05 is a device configured to perform various control functions as well as a mobility management function for a terminal, and may be connected to a plurality of base stations. In addition, the NR system may be linked to a conventional LTE system, and the NR CN 1c-05 is connected to an MME 1c-25 through a network interface. The MME 1c-25 may be connected to an eNB 1c-30 that is an existing base station.

Figure 1D:
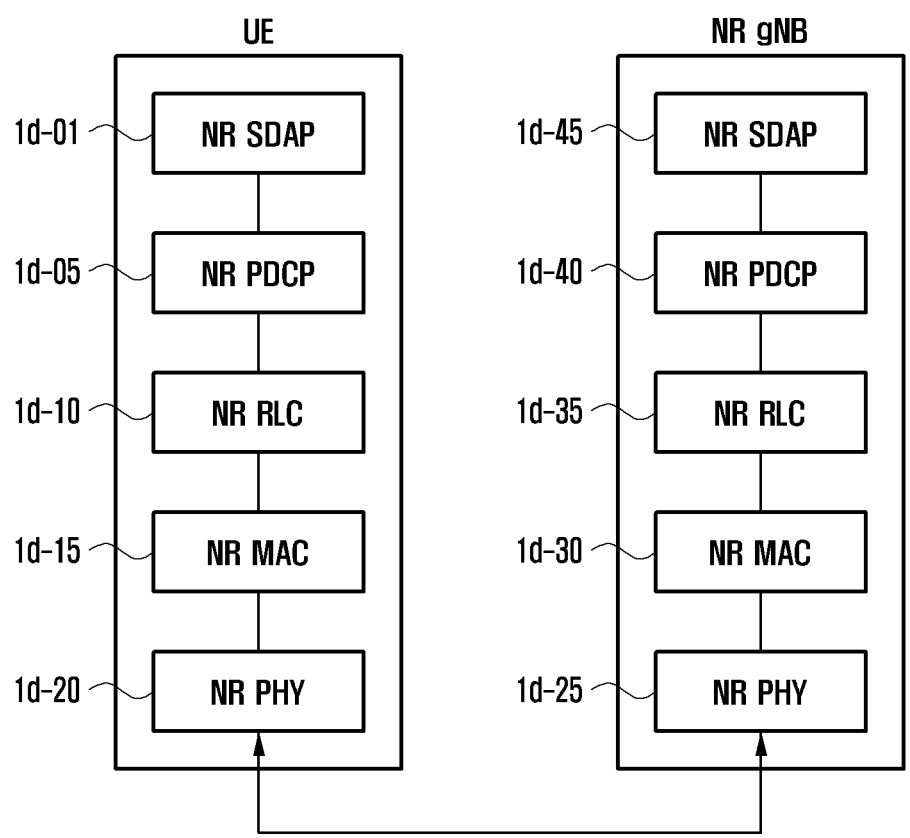
FIG. 1D illustrates a wireless protocol structure of a next generation mobile communication system according to an embodiment of the disclosure.

FIG. 1D illustrates a wireless protocol structure of a next generation mobile communication system according to an embodiment of the disclosure.

Referring to FIG. 1D, a wireless protocol of a next generation mobile communication system may include NR service data adaptation protocols (SDAPs) 1d-01 and 1d-45, NR PDCPs 1d-05 and 1d-40, NR RLCs 1d-10 and 1d-35, and NR MACs 1d-15 and 1d-30 of a terminal and an NR base station, respectively.

According to a part of embodiments, main functions of the NR SDAPs 1d-01 and 1d-45 may include a part of functions below. However, the functions are not limited to an example below.

Transfer of user data (transfer of user plane data)

Mapping between a QoS flow and a data bearer (DRB) for both downlink (DL) and uplink (UL)

Marking QoS flow ID in DL and UL (marking QoS flow ID in both DL and UL packets)

Mapping a reflective QoS flow to a data bearer with respect to UL SDAP PDUs (reflective QoS flow to DRB mapping for the UL SDAP PDUs)

In relation to an SDAP layer device, the terminal may receive a configuration relating to whether to use a function of the SDAP layer device or whether to use a header of the SDAP layer device for each PDCP layer device, each bearer, or each logical channel, through a radio resource control (RRC) message. In addition, if a SDAP header is configured, the SDAP layer device may instruct the terminal to update or reconfigure mapping information relating to a QoS flow and a data bearer for uplink and downlink, through a non-access stratum (NAS) quality of service (QoS) reflective configuration 1-bit indicator (NAS reflective QoS) and an access stratum (AS) QoS reflective configuration 1-bit indicator (AS reflective QoS) of the SDAP header. According to a part of embodiments, a SDAP header may include QoS flow ID information indicating QoS. According to a part of embodiments, QoS information may be used as data processing priority, scheduling information, etc. for supporting smooth service.

According to a part of embodiments, main functions of the NR PDCPs 1d-05 and 1d-40 may include a part of functions below. However, the functions are not limited to an example below.

Header compression and decompression (ROHC only)
Transfer of user data
In-sequence delivery (In-sequence delivery of upper layer PDUs)
Out-of-sequence delivery (Out-of-sequence delivery of upper layer PDUs)
Reordering (PDCP PDU reordering for reception)
Duplicate detection (Duplicate detection of lower layer SDUs)
Retransmission (Retransmission of PDCP SDUs)
Ciphering and deciphering
Timer-based SDU discard (Timer-based SDU discard in uplink)

In the description above, a reordering function of a NR PDCP device may mean reordering of PDCP PDUs received from a lower layer, according to an order based on a PDCP sequence number (SN). A reordering function of a NR PDCP device may include a function of transferring data to an upper layer according to a rearranged order, or may include a function of directly transferring data without considering order, may include a function of rearranging an order to record lost PDCP PDUs, may include a function of reporting the state of lost PDCP PDUs to a transmission side, and may include a function of requesting retransmission of lost PDCP PDUs.

According to a part of embodiments, main functions of the NR RLCs 1d-10 and 1d-35 may include a part of functions below. However the functions are not limited to an example below.

Data transfer (Transfer of upper layer PDUs)
In-sequence delivery (In-sequence delivery of upper layer PDUs)
Out-of-sequence delivery (Out-of-sequence delivery of upper layer PDUs)
ARQ (Error correction through ARQ)
Concatenation, segmentation and reassembly (Concatenation, segmentation and reassembly of RLC SDUs)
Re-segmentation (Re-segmentation of RLC data PDUs)
Reordering (Reordering of RLC data PDUs)
Duplicate detection
Error detection (Protocol error detection)
RLC SDU discard
RLC re-establishment In the above description, an in-sequence delivery function of a NR RLC device may mean a function of transferring RLC SDUs received from a lower layer, to an upper layer according to an order. An in-sequence delivery function of a NR RLC device may include a function of, if a single RLC SDU is divided into several RLC SDUs and then the RLC SDUs are received, reassembling the several RLC SDUs and transmitting the reassembled RLC SDUs.

An in-sequence delivery function of a NR RLC device may include a function of rearranging received RLC PDUs with reference to a RLC sequence number (SN) or a PDCP sequence number (SN), may include a function of rearranging an order to record lost RLC PDUs, may include a function of reporting the state of lost RLC PDUs to a transmission side, and may include a function of requesting retransmission of lost RLC PDUs.

An in-sequence delivery function of a NR RLC device may include a function of, if there is a lost RLC SDU, only transferring RLC SDUs before the lost RLC SDU to an upper layer according to an order.

An in-sequence delivery function of a NR RLC device may include a function of, although there is a lost RLC SDU, if a predetermined timer is expired, transferring all the RLC SDUs received before the timer has started, to an upper layer according to an order.

An in-sequence delivery function of a NR RLC device may include a function of, although there is a lost RLC SDU, if a predetermined timer is expired, transferring all the RLC SDUs received until the current time point, to an upper layer according to an order.

An NR RLC device may process RLC PDUs according to an order in which the RLC PDUs have been received, regardless of an order based on a sequence number (out-of sequence delivery), and transfer the processed RLC PDUs to an NR PDCP device.

In a case of segment reception of an NR RLC device, the NR RLC device may receive segments that have been stored in a buffer or are to be received later, reconfigure the segments into a single intact RLC PDU, and transfer the RLC PDU to an NR PDCP device.

An NR RLC layer may not include a concatenation function, and a function in an NR MAC layer may be performed or the concatenation function may be replaced with a multiplexing function of an NR MAC layer.

In the above description, an out-of-sequence delivery function of a NR RLC device may mean a function of directly transferring RLC SDUs received from a lower layer, to an upper layer regardless of an order. An out-of-sequence delivery function of a NR RLC device may include a function of, if a single RLC SDU is divided into several RLC SDUs and then the RLC SDUs are received, reassembling the several RLC SDUs and transmitting the reassembled RLC SDUs. An out-of-sequence delivery function of a NR RLC device may include a function of storing RLC SNs or PDCP SNs of received RLC PDUs and sequencing the RLC PDUs to record lost RLC PDUs.

According to a part of embodiments, the NR MACs 1d-15 and 1d-30 may be connected to several NR RLC layer devices configured in a single terminal, and main functions of an NR MAC may include a part of functions below. However, the functions are not limited to an example below.

Mapping (Mapping between logical channels and transport channels)
Multiplexing and demultiplexing (Multiplexing/demultiplexing of MAC SDUs)
Scheduling information reporting
HARQ (Error correction through HARQ)
Priority handling between logical channels (Priority handling between logical channels of one UE)
Priority handling between UEs (Priority handling between UEs by means of dynamic scheduling)
MBMS service identification
Transport format selection
Padding According to a part of embodiments, NR physical layers 1d-20 and 1d-25 may perform channel coding and modulation on upper layer data to make the data into an OFDM symbol and transmit the OFDM symbol through a wireless channel, or may demodulate and channel-decode an OFDM symbol received through a wireless channel, and then transfer the OFDM symbol to an upper layer.

Figure 1E:
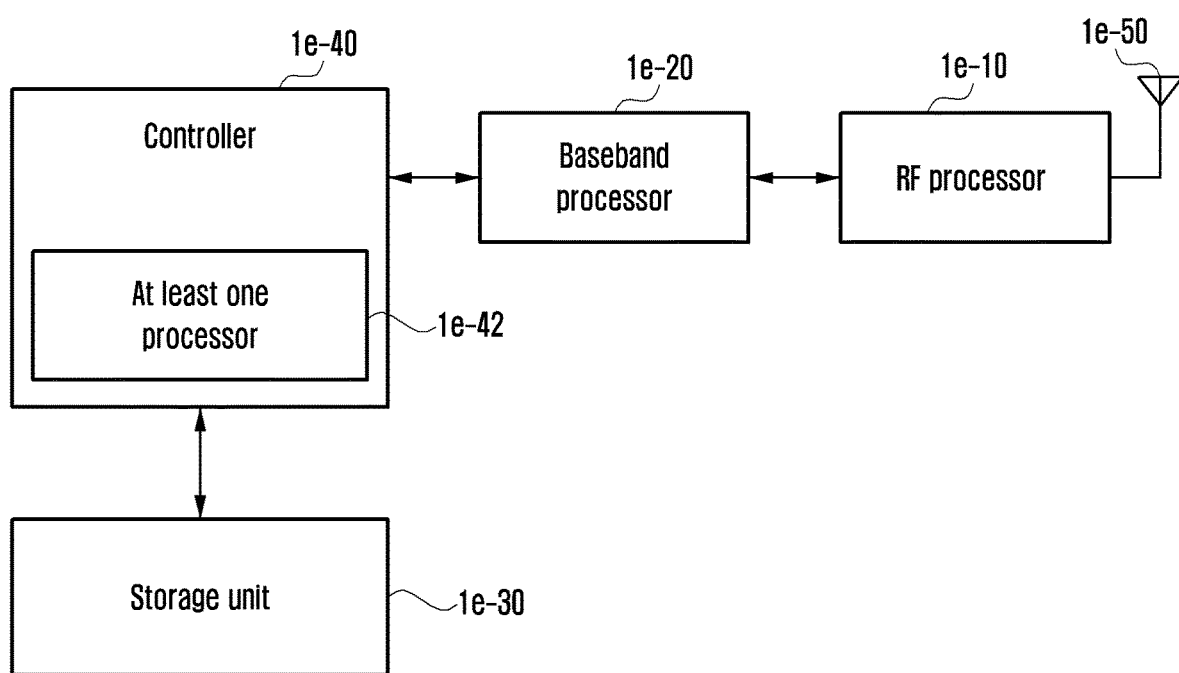
FIG. 1E is a block diagram illustrating an internal structure of a terminal according to an embodiment of the disclosure.

FIG. 1E is a block diagram illustrating an internal structure of a terminal according to an embodiment of the disclosure.

Referring to FIG. 1E, a terminal may include a radio frequency (RF) processor 1e-10, a baseband processor 1e-20, a storage unit 1e-30, and a controller 1e-40. However, the disclosure is not limited to the example described above, and a terminal may include a smaller or larger number of elements compared to the elements illustrated in FIG. 1E.

The RF processor 1e-10 may perform a function, such as signal band change, amplification, etc., for transmitting or receiving the signal through a wireless channel That is, the RF processor 1e-10 may up-convert a baseband signal provided from the baseband processor 1e-20 into an RF band signal, and then transmit the RF band signal through an antenna 1e-50, and may down-convert an RF band signal received through the antenna 1e-50 into a baseband signal. For example, the RF processor 1e-10 may include a transmission filter, a reception filter, an amplifier, a mixer, an oscillator, a digital-to-analog converter (DAC), an analog-to-digital converter (ADC), and the like. The disclosure is not limited to the example described above. In FIG. 1E, only one antenna 1e-50 is illustrated, but the terminal may include a plurality of antennas. Furthermore, the RF processor 1e-10 may include a plurality of RF chains. Furthermore, the RF processor 1e-10 may perform beamforming. To perform beamforming, the RF processor 1e-10 may adjust the phase and size of each of signals transmitted or received through a plurality of antennas or antenna elements. In addition, the RF processor 1e-10 may perform multi input multi output (MIMO), and may receive several layers at the time of performing a MIMO operation.

The baseband processor 1e-20 performs a function of conversion between a baseband signal and a bit stream according to a physical layer protocol of a system. For example, when data is transmitted, the baseband processor 1e-20 generates complex symbols by encoding and modulating a transmission bit stream. In addition, when data is received, the baseband processor 1e-20 reconstructs a reception bit stream by demodulating and decoding a baseband signal provided from the RF processor 1e-10. For example, in a case where an orthogonal frequency division multiplexing (OFDM) scheme is applied, when data is transmitted, the baseband processor 1e-20 generates complex symbols by encoding and modulating a transmission bit stream, maps the complex symbols to subcarriers, and then configures OFDM symbols through inverse fast Fourier transform (IFFT) calculation and cyclic prefix (CP) insertion. In addition, when data is received, the baseband processor 1e-20 may divide a baseband signal provided from the RF processor 1e-10, by the units of OFDM symbols, reconstruct signals mapped to subcarriers, through fast Fourier transform (FFT), and then reconstruct a reception bit stream through demodulation and decoding.

The baseband processor 1e-20 and the RF processor 1e-10 transmit and receive a signal as described above. The baseband processor 1e-20 and the RF processor 1e-10 may be called a transmitter, a receiver, a transceiver, or a communication unit. Furthermore, at least one of the baseband processor 1e-20 and the RF processor 1e-10 may include a plurality of communication modules to support a plurality of different wireless access technologies. In addition, at least one of the baseband processor 1e-20 and the RF processor 1e-10 may include different communication modules to process signals in different frequency bands. For example, different wireless access technologies may include wireless LAN (e.g. IEEE 802.11), cellular network (e.g. LTE), etc. Furthermore, different frequency bands may include a super high frequency (SHF) (e.g. 2.NRHz and NGHz) band, a millimeter (mm) wave (e.g. 60 GHz) band, etc. The terminal may transmit or receive a signal to or from a base station by using the baseband processor 1e-20 and the RF processor 1e-10, and the signal may include control information and data.

The storage unit 1e-30 stores data such as a basic program, an application program, and configuration information for an operation of the terminal. Particularly, the storage unit 1e-30 may store information relating to a second access node that performs wireless communication by using a second wireless access technology. The storage unit 1e-30 provides stored data in response to a request of the controller 1e-40. The storage unit 1e-30 may include a storage medium such as ROM, RAM, hard disk, CD-ROM, and DVD, or a combination of storage mediums. In addition, the storage unit 1e-30 may include a plurality of memories.

The controller 1e-40 controls overall operations of the terminal. For example, the controller 1e-40 transmits or receives a signal through the baseband processor 1e-20 and the RF processor 1e-10. Furthermore, the controller 1e-40 records and reads data in and from the storage unit 1e-30. To this end, the controller 1e-40 may include at least one processor 1e-42. For example, the controller 1e-40 may include a communication processor (CP) performing a control for communication, and an application processor (AP) controlling a higher layer, such as an application program. In addition, at least one element in the terminal may be implemented as a single chip.

Figure 1F:
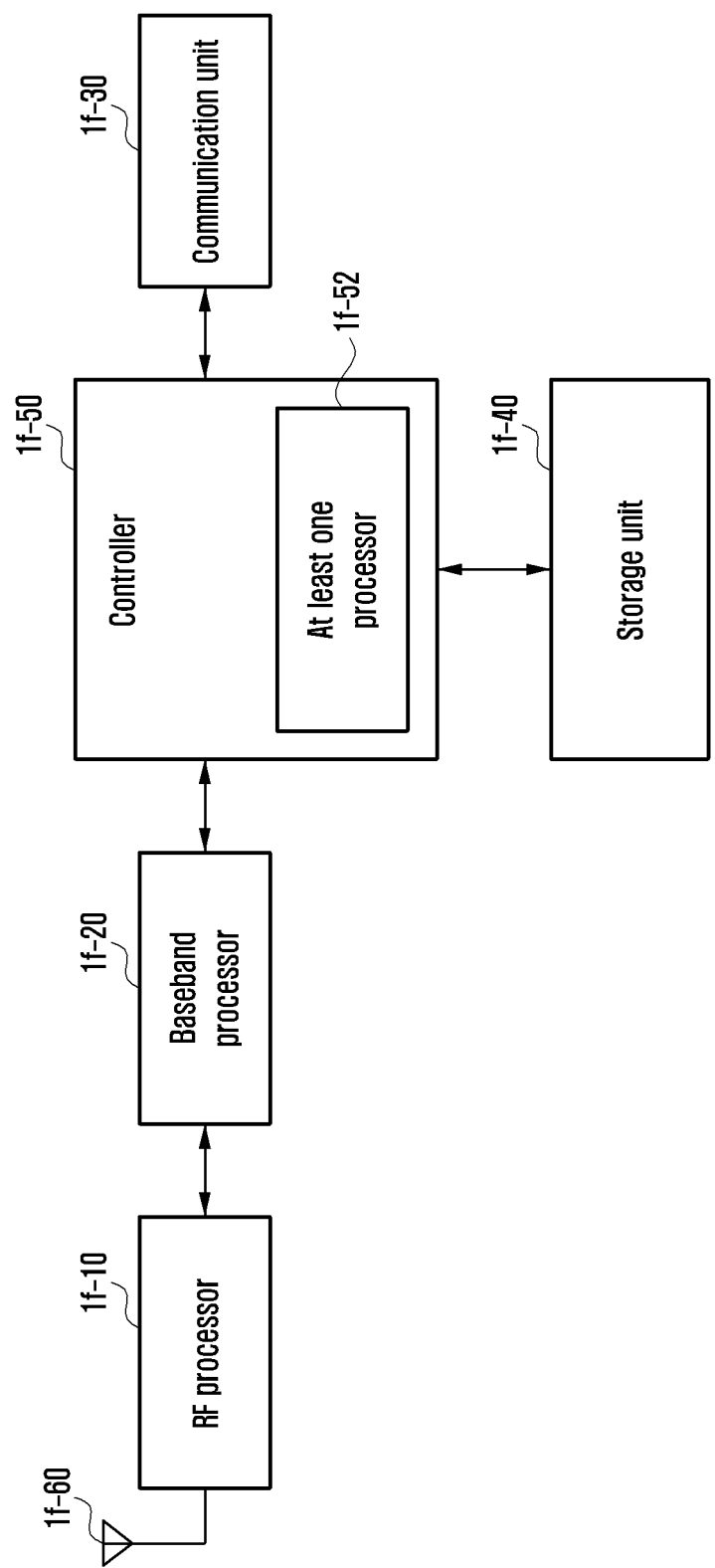
FIG. 1F is a block diagram illustrating a configuration of a NR base station according to an embodiment of the disclosure.

FIG. 1F is a block diagram illustrating a configuration of a NR base station according to an embodiment of the disclosure.

Referring to FIG. 1F, a base station may include a radio frequency (RF) processor 1f-10, a baseband processor 1f-20, a backhaul communication unit 1f-30, a storage unit 1f-40, and a controller 1f-50. However, the disclosure is not limited to the example described above, and a base station may include a smaller or larger number of elements, compared to the elements illustrated in FIG. 1F.

The RF processor 1f-10 may perform a function, such as signal band change, amplification, etc., for transmitting or receiving a signal through a wireless channel That is, the RF processor 1f-10 may up-convert a baseband signal provided from the baseband processor 1f-20 into an RF band signal, and then transmit the RF band signal through an antenna 1f-60, and may down-convert an RF band signal received through the antenna 1f-60 into a baseband signal. For example, the RF processor 1f-10 may include a transmission filter, a reception filter, an amplifier, a mixer, an oscillator, a DAC, an ADC, and the like. In FIG. 1F, only one antenna 1f-60 is illustrated, but the RF processor 1f-10 may include a plurality of antennas. Furthermore, the RF processor 1f-10 may include a plurality of RF chains. Furthermore, the RF processor 1f-10 may perform beamforming. To perform beamforming, the RF processor 1f-10 may adjust the phase and size of each of signals transmitted or received through a plurality of antennas or antenna elements. The RF processor may perform a downlink MIMO operation by transmitting at least one layer.

The baseband processor 1f-20 performs a function of conversion between a baseband signal and a bit stream according to a physical layer protocol of a first wireless access technology. For example, when data is transmitted, the baseband processor 1f-20 generates complex symbols by encoding and modulating a transmission bit stream. In addition, when data is received, the baseband processor 1f-20 reconstructs a reception bit stream by demodulating and decoding a baseband signal provided from the RF processor 1f-10. For example, in a case where an OFDM scheme is applied, when data is transmitted, the baseband processor 1f-20 generates complex symbols by encoding and modulating a transmission bit stream, maps the complex symbols to subcarriers, and then configures OFDM symbols through IFFT calculation and CP insertion. In addition, when data is received, the baseband processor 1f-20 may divide a baseband signal provided from the RF processor 1f-10, by the units of OFDM symbols, reconstruct signals mapped to subcarriers, through FFT, and then reconstruct a reception bit stream through demodulation and decoding. The baseband processor 1f-20 and the RF processor 1f-10 may transmit and receive a signal as described above. Accordingly, the baseband processor 1f-20 and the RF processor 1f-10 may be called a transmitter, a receiver, a transceiver, a communication unit or a wireless communication unit. The base station may transmit or receive a signal to or from a terminal by using the baseband processor 1f-20 and the RF processor 1f-10, and the signal may include control information and data.

The backhaul communication unit 1f-30 provides an interface for performing communication with other nodes within a network. That is, the backhaul communication unit 1f-30 may convert, into a physical signal, a bit stream transmitted from a main base station to another node, for example, an auxiliary base station, a core network, etc., and may convert a physical signal received from another node, into a bit stream. The backhaul communication unit 1f-30 may be included in a communication unit.

The storage unit 1f-40 stores data such as a basic program, an application program, and configuration information for an operation of the base station. The storage unit 1f-40 may store information relating to a bearer assigned to a connected terminal, a measurement result reported from a connected terminal, etc. In addition, the storage unit 1f-40 may store information serving as a determination criterion of whether to provide or stop providing multi-connection to a terminal. The storage unit 1f-40 provides stored data in response to a request of the controller 1f-50. The storage unit 1f-40 may include a storage medium such as ROM, RAM, hard disk, CD-ROM, and DVD, or a combination of storage mediums. In addition, the storage unit 1f-40 may include a plurality of memories. According to a part of embodiments, the storage unit 1f-40 may store a program for performing a buffer state reporting method according to the disclosure.

The controller 1f-50 controls overall operations of the base station. For example, the controller 1f-50 transmits or receives a signal through the baseband processor 1f-20 and the RF processor 1f-10, or the backhaul communication unit 1f-30. Furthermore, the controller 1f-50 records and reads data in and from the storage unit 1f-40. To this end, the controller 1f-50 may include at least one processor 1f-52. In addition, at least one element in the base station may be implemented as a single chip.

Figure 1G:
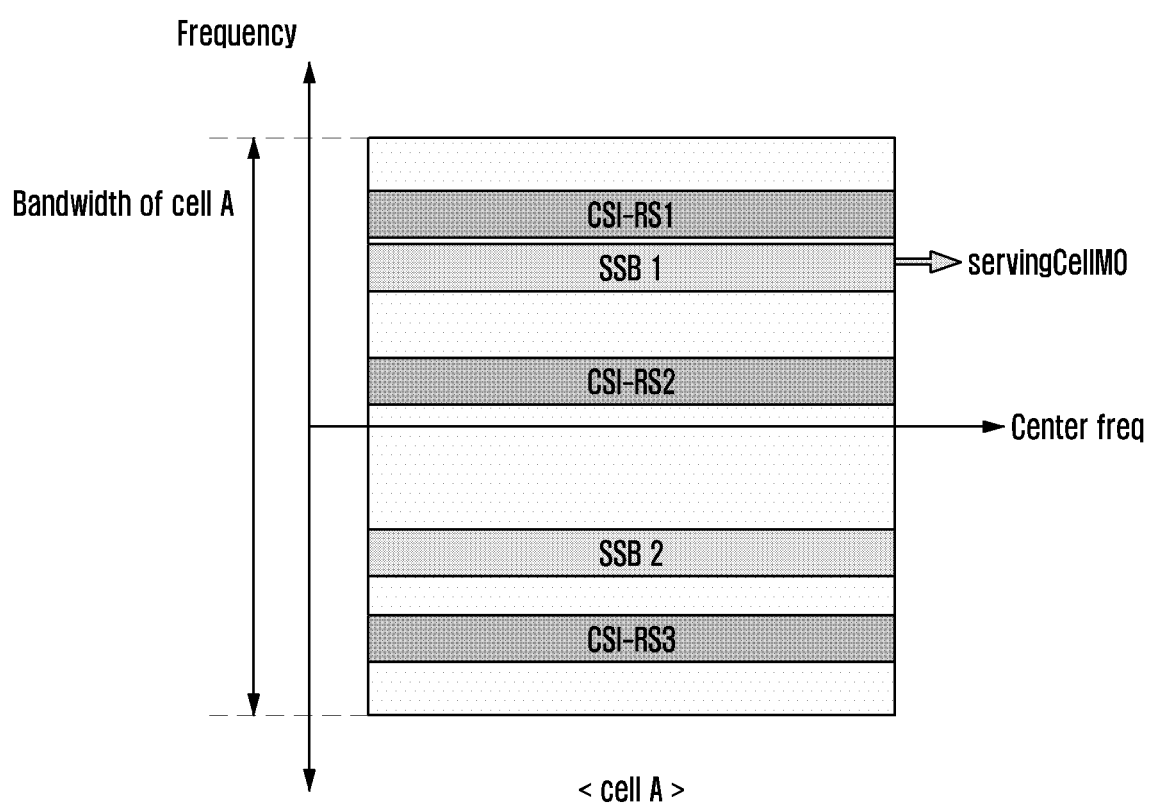
FIG. 1G illustrates a measurement object for each cell according to an embodiment of the disclosure.

FIG. 1G illustrates a measurement object for each cell according to an embodiment of the disclosure.

Cells in LTE may be discriminated by a center frequency and a bandwidth, and specifically, since a center frequency of each carrier is defined, center frequency-based absolute radio-frequency channel number (ARFCN) information, etc. may be used as a measurement object for strength measurement of a corresponding signal. That is, a center frequency and a cell are mapped in one-to-one correspondence with each other. However, in NR, multiple measurable frequency bands defined in a cell may exist regardless of a center frequency suitable for the bandwidth of the cell, as illustrated in FIG. 1G.

Referring to FIG. 1G, frequency regions indicated by synchronization signal blocks (SSBs) 1 and 2 in cell A may mean a frequency region in which SSB 1 or SSB 2 is transmitted as a reference signal for cell signal strength measurement. In addition, CSI-RSs 1, 2, and 3 mean frequency regions in which CSI-RSs 1, 2, and 3 are transmitted as reference signals for cell signal strength measurement. Cell A includes multiple reference signal transmission regions for cell signal strength measurement, and thus a measurement object for radio resource management (RRM) may be configured for one or multiple regions among the multiple reference signal transmission regions. In NR, for the purpose of serving cell signal strength measurement, only one measurement object among multiple reference signal transmission regions may be designated, and is defined as a servingcellMO. For RRM, only a frequency region designated as a serving cell MO may be subjected to serving cell signal strength measurement.

Figure 1H:
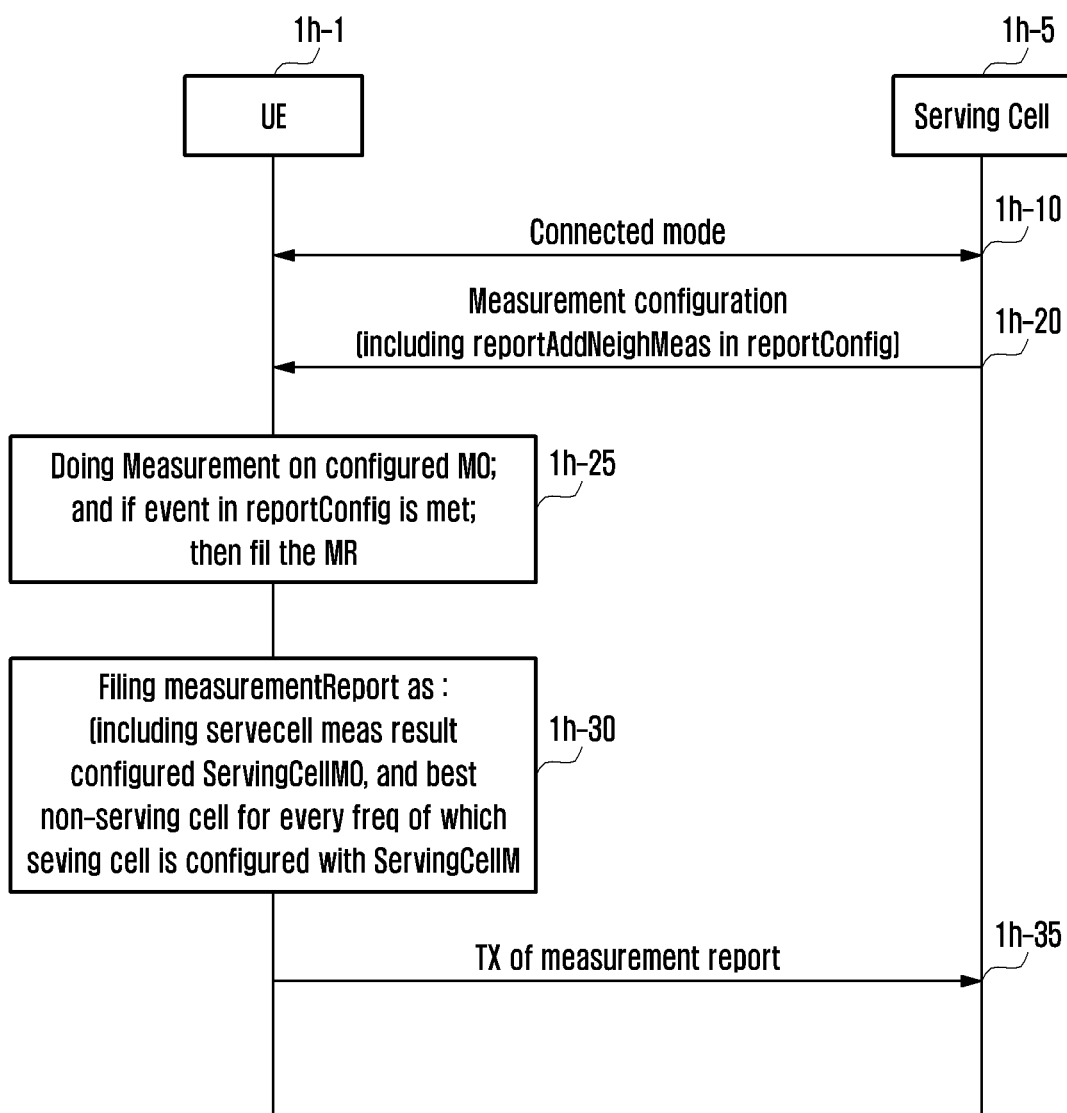
FIG. 1H illustrates communication with a serving cell according to making of a measurement report according to an embodiment of the disclosure.

FIG. 1H illustrates communication with a serving cell according to making of a measurement report according to an embodiment of the disclosure.

A terminal 1h-1 is connected to a serving cell 1h-5 (1h-10). The serving cell 1h-5 may configure, in a measurement configuration, a reportAddNeighMeas in a particular measID-associated reportConfig, and may transfer the measurement configuration to the terminal 1h-1 (1h-20). The terminal 1h-1 receiving the measurement configuration performs measurements in a given measID, and in a case where a measurement is performed by using a measurement object (MO) and a reportConfig associated with each measID, if a measurement report triggering condition is satisfied (1h-25), the terminal puts a serving cell measurement result in a measurement report (1h-30) and transmits the measurement report to the serving cell 1h-5 (1h-35). If a reportAddNeighMeas is configured in operation 1h-20 and the terminal receives the reportAddNeighMeas, the terminal also includes, in the measurement report, a result on a best neighboring cell among neighboring cells, as well as the serving cell result. The serving cell result may include a measurement result on serving cells configured with servingCellMOs. In addition, as the neighboring cell result, an operation below may be performed with respect to an NR frequency of a serving cell configured with a servingCellMO or an NR serving frequency of a serving cell configured with a servingCellMO, among frequencies except a frequency corresponding to a measID triggering the MR.

If a measResultBestNeighCell value is put in a measResultServingMOList in the MR, available measurement quantities and a physCellId of a best non-serving cell are put. The measurement quantities are measured based on a reportQuantityCell and a rsType indicated in a reportConfig associated with a measObjectNR indicated by a servingCellMO. In addition, the best non-serving cell may be a cell having the highest RSRP if RSRP measurement is configured in the reportConfig associated with the measObjectNR, may be a cell having the highest RSRQ if RSRQ measurement is configured, or may be a cell having the highest SINR.

For each NR serving frequency, other than the frequency corresponding with the measId that triggered the measurement reporting, of which serving cell is configured with servingCellMO;

UE sets the measResultBestNeighCell within measResultServingMOList to include the physCellId and the available measurement quantities of the best non-serving cell, based on the reportQuantityCell and rsType indicated in reportConfig corresponding to the measObjectNR indicated by servingCellMO, with best corresponding to the highest measured RSRP if RSRP measurement results are available for cells corresponding to this measObjectNR, otherwise corresponding to the highest measured RSRQ if RSRQ measurement results are available for cells corresponding to this measObjectNR, otherwise corresponding to the highest measured SINR;

According to another embodiment, the serving frequency in the example may be replaced by a frequency or a cell as described below.

Figure 1I:
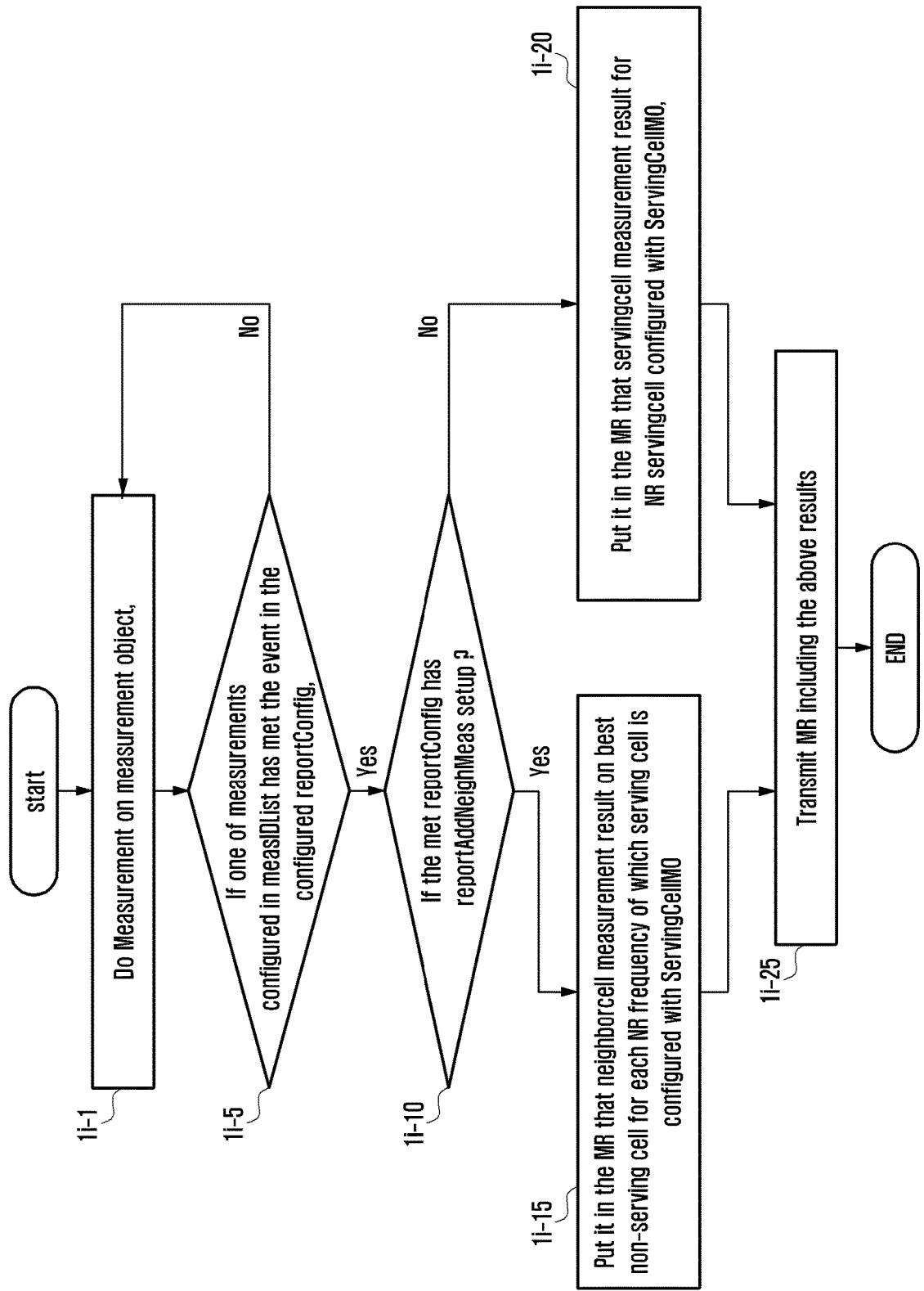
FIG. 1I illustrates a terminal operation for making a measurement report of a terminal according to an embodiment of the disclosure.

For each NR frequency, other than the frequency corresponding with the measId that triggered the measurement reporting, of which serving cell is configured with servingCellMO;

UE sets the me asResultBestNeighCell within measResultServingMOList to include the physCellId and the available measurement quantities of the best non-serving cell, based on the reportQuantityCell and rsType indicated in reportConfig corresponding to the measObjectNR indicated by servingCellMO, with best corresponding to the highest measured RSRP if RSRP measurement results are available for cells corresponding to this measObjectNR, otherwise corresponding to the highest measured RSRQ if RSRQ measurement results are available for cells corresponding to this measObjectNR, otherwise corresponding to the highest measured SINR;

FIG. 1I illustrates a terminal operation for making a measurement report of a terminal according to an embodiment of the disclosure.

After a terminal receives a measurement configuration from a serving cell, the terminal may start measuring an MO corresponding to the given configuration (1i-1). The terminal may measure an MO configured to a measID among given measIDs, to determine whether an event given in a reportConfig associated with the measID is satisfied (1i-5). If the terminal measures an MO configured to a measID among the given measIDs, and an event given in a reportConfig associated with the measID is satisfied, the terminal may determine whether a reportAddNeighMeas is configured in the reportConfig satisfying a corresponding condition (1i-10). If a reportAddNeighMeas is configured in the reportConfig, the terminal may include, in an MR, with respect to an NR (serving) frequency of a serving cell configured with a servingCellMO, a measurement result value of a best non-serving cell, described with reference to FIG. 1H (1i-15). In addition, the MR may also include a measurement result value of an NR serving cell configured with a servingCellMO (1i-20). If a reportAddNeighMeas is not configured in the reportConfig of the triggered event, the terminal may include, in the MR, only a measurement result value of an NR serving cell configured with a servingCellMO (1i-20) and then transmit the MR to a serving base station (1i-25).

Figure 2A:
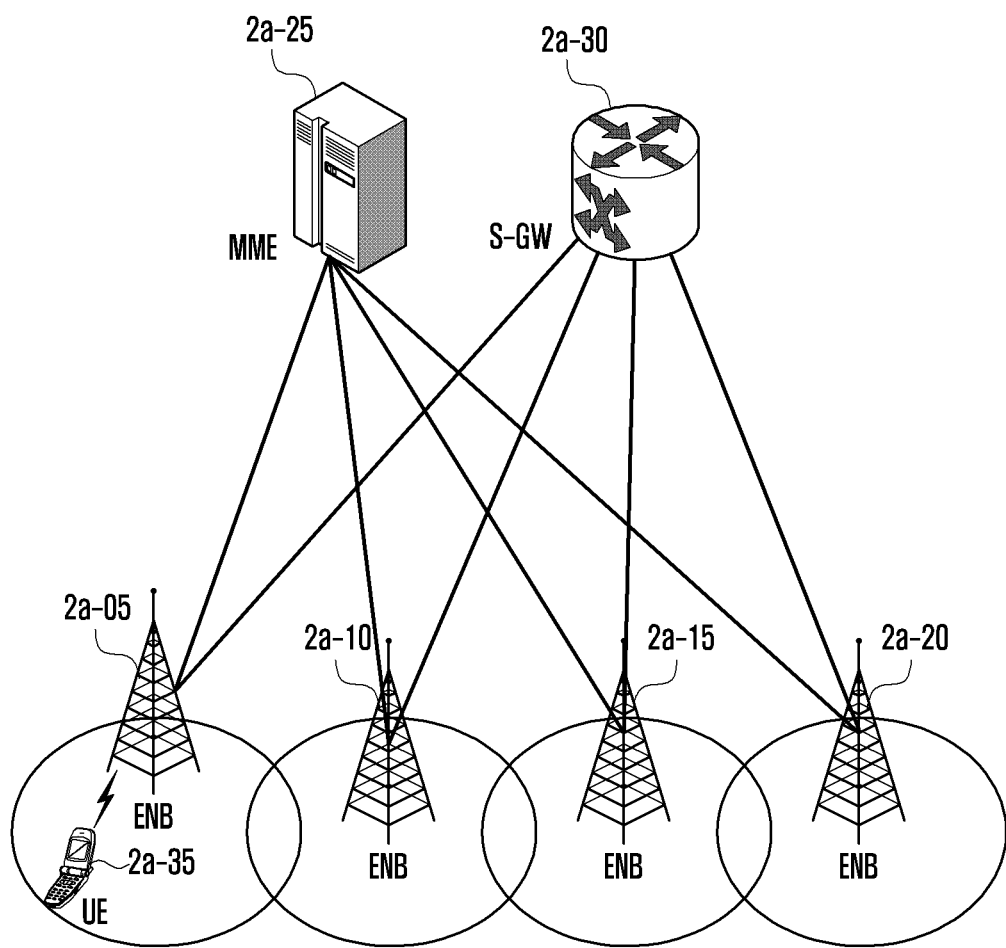
FIG. 2A illustrates a structure of an LTE system according to an embodiment of the disclosure.

FIG. 2A illustrates a structure of an LTE system according to an embodiment of the disclosure.

Referring to FIG. 2A, as illustrated, a wireless access network of a LTE system may include next generation base stations (an evolved node B, hereinafter, an ENB, a Node B, or a base station) 2a-05, 2a-10, 2a-15, and 2a-20, a mobility management entity (MME) 2a-25, and a serving gateway (S-GW) 2a-30. A user equipment (hereinafter, UE or terminal) 2a-35 may access an external network through the ENBs 2a-05, 2a-10, 2a-15, and 2a-20, and the S-GW 2a-30.

In FIG. 2A, the ENBs 2a-05, 2a-10, 2a-15, and 2a-20 may correspond to a conventional node B in a UMTS system. An ENB may be connected to the UE 2a-35 through a wireless channel and may perform complex functions compared to the conventional node B. In an LTE system, all the user traffics including real-time service such as a voice over IP (VoIP) through an Internet protocol may be serviced through a shared channel Therefore, an LTE system may require a device configured to collect state information, such as a buffer state, an available transmission power state, and a channel state of UEs, and perform scheduling, and the ENBs 2a-05 to 2a-20 may serve as the device. A single ENB may generally control a plurality of cells. For example, an LTE system may use, as a wireless access technology, for example, an orthogonal frequency division multiplexing (OFDM) scheme in a bandwidth of 20 MHz in order to implement a transfer rate of 100 Mbps. Furthermore, an ENB may employ an adaptive modulation and coding (AMC) scheme for determining a modulation scheme and a channel coding rate according to a channel state of a terminal. The S-GW 2a-30 may be a device configured to provide a data bearer, and may generate or remove a data bearer according to a control of the MME 2a-25. The MME is a device configured to perform various control functions as well as a mobility management function for a terminal, and may be connected to a plurality of base stations.

Figure 2B:
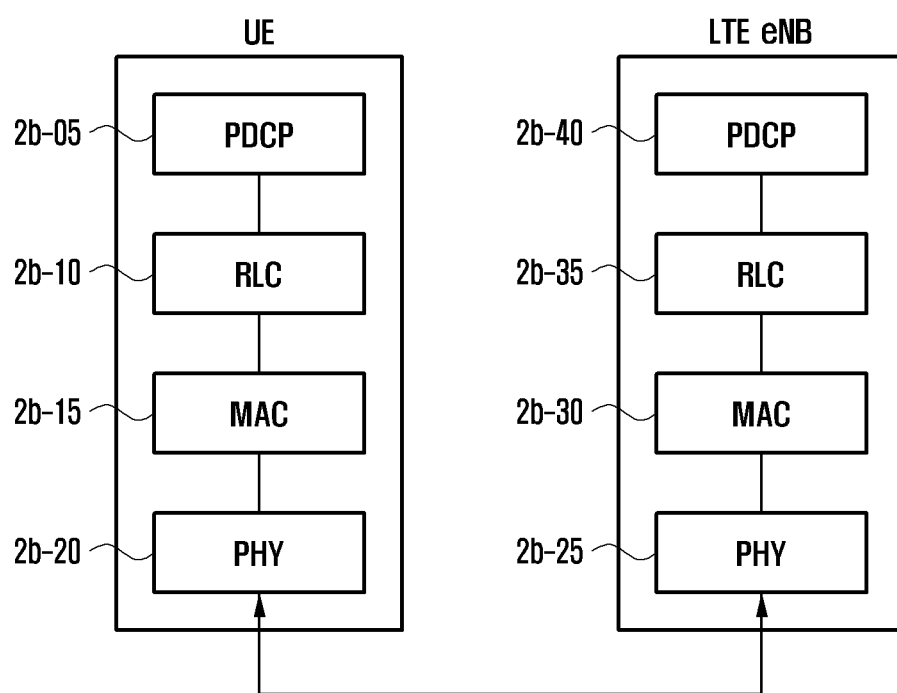
FIG. 2B illustrates a wireless protocol structure of an LTE system according to an embodiment of the disclosure.

FIG. 2B illustrates a wireless protocol structure of an LTE system according to an embodiment of the disclosure.

Referring to FIG. 2B, a wireless protocol of an LTE system may include packet data convergence protocol (PDCP) 2b-05 and 2b-40, radio link controls (RLC) 2b-10 and 2b-35, medium access controls (MAC) 2b-15 and 2b-30 of a terminal and an ENB, respectively. A PDCP may function to perform an operation such as compression/reconstruction of an IP header. Main functions of a PDCP may be summarized as below. However, the main functions are not limited to an example below.

Header compression and decompression (ROHC only)
 Transfer of user data
 In-sequence delivery (In-sequence delivery of upper layer PDUs at PDCP re-establishment procedure for RLC AM)
 Reordering (For split bearers in DC (only support for RLC AM): PDCP PDU routing for transmission and PDCP PDU reordering for reception)
 Duplicate detection (Duplicate detection of lower layer SDUs at PDCP re-establishment procedure for RLC AM)
 Retransmission (Retransmission of PDCP SDUs at handover and, for split bearers in DC, of PDCP PDUs at PDCP data-recovery procedure, for RLC AM)
 Ciphering and deciphering
 Timer-based SDU discard (Timer-based SDU discard in uplink)

According to a part of embodiments, the radio link controls (RLC) 2b-10 and 2b-35 may reconfigure a PDCP packet data unit (PDU) to have a proper size, so as to perform an ARQ operation, and the like. Main functions of an RLC may be summarized as below. However, the main functions are not limited to an example below.

Data transfer (Transfer of upper layer PDUs)
 ARQ (Error Correction through ARQ (only for AM data transfer))
 Concatenation, segmentation and reassembly (Concatenation, segmentation and reassembly of RLC SDUs (only for UM and AM data transfer))
 Re-segmentation (Re-segmentation of RLC data PDUs (only for AM data transfer))
 Reordering (Reordering of RLC data PDUs (only for UM and AM data transfer)
 Duplicate detection (Duplicate detection (only for UM and AM data transfer))
 Error detection (Protocol error detection (only for AM data transfer))
 RLC SDU discard (only for UM and AM data transfer)

RLC re-establishment

According to a part of embodiments, the MACs 2b-15 and 2b-30 may be connected to several RLC layer devices configured in a single terminal, may multiplex RLC PDUs to a MAC PDU, and may demultiplex a MAC PDU to RLC PDUs. Main functions of a MAC may be summarized as below. However, the functions are not limited to an example below.

Mapping (Mapping between logical channels and transport channels)

Multiplexing and demultiplexing (Multiplexing/demultiplexing of MAC SDUs belonging to one or different logical channels into/from transport blocks (TB) delivered to/from the physical layer on transport channels)

Scheduling information reporting

HARQ (Error correction through HARQ)

Priority handling between logical channels (Priority handling between logical channels of one UE)

Priority handling between UEs (Priority handling between UEs by means of dynamic scheduling)

MBMS service identification

Transport format selection

Padding

According to a part of embodiments, physical layers 2b-20 and 2b-25 may perform channel coding and modulation on upper layer data to make the data into an OFDM symbol and transmit the OFDM symbol through a wireless channel, or may demodulate and channel-decode an OFDM symbol received through a wireless channel, and then transfer the OFDM symbol to an upper layer. However, the disclosure is not limited to the example below.

Figure 2C:
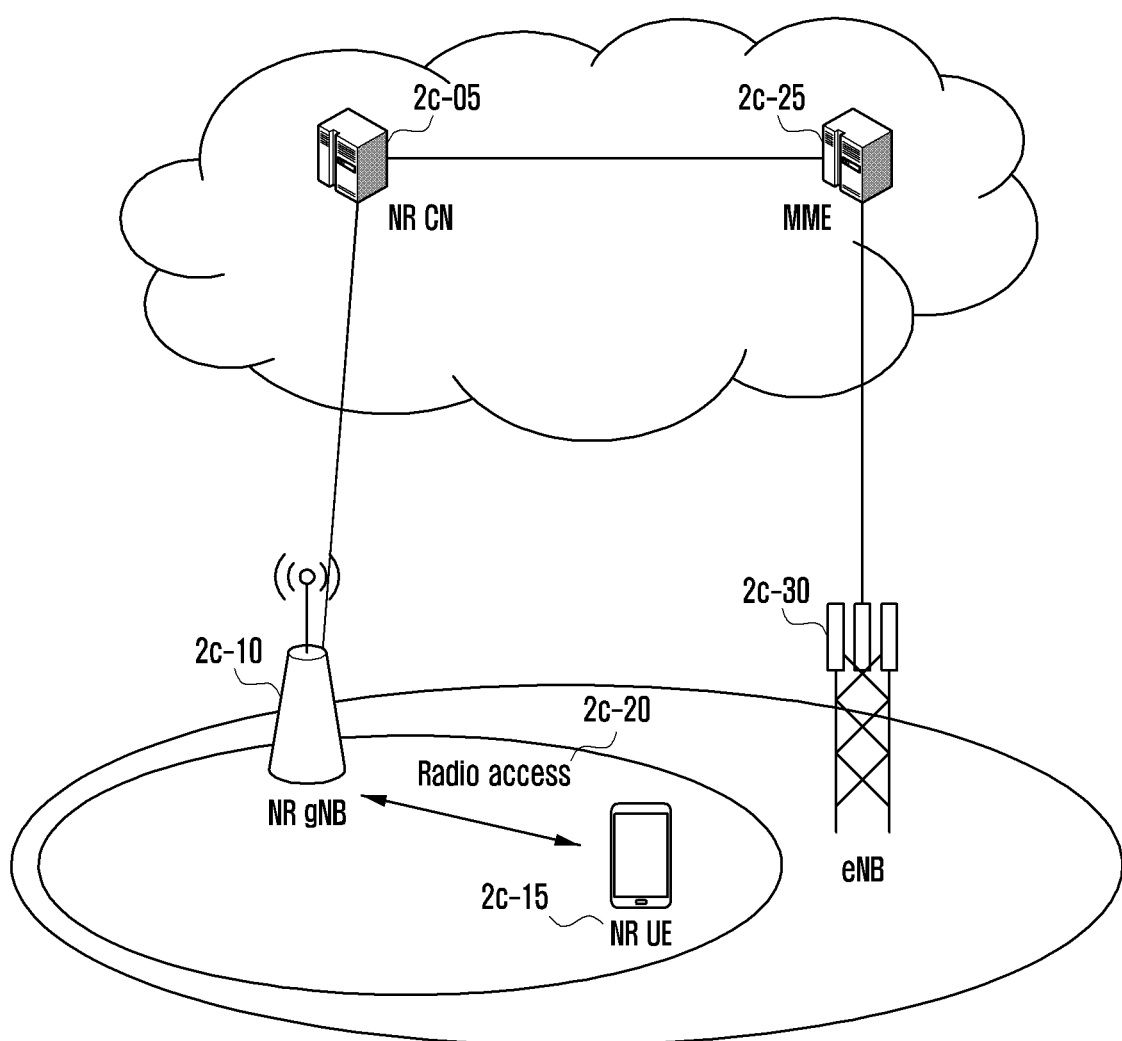
FIG. 2C illustrates a structure of a next generation mobile communication system according to an embodiment of the disclosure.

FIG. 2C illustrates a structure of a next generation mobile communication system according to an embodiment of the disclosure.

Referring to FIG. 2C, a wireless access network of a next generation mobile communication system (hereinafter, NR or 2g) may include a next generation base station (new radio node B, hereinafter, NR gNB or NR base station) 2c-10 and a next generation wireless core network (new radio core network, NR CN) 2c-05. A next generation wireless user equipment (new radio user equipment, NR UE or terminal) 2c-15 may access an external network through the NR gNB 2c-10 and the NR CN 2c-05.

In FIG. 2C, the NR gNB 2c-10 may correspond to an evolved node B (eNB) of a conventional LTE system. The NR gNB 2c-10 is connected to the NR UE 2c-15 through a wireless channel 2c-20 and may provide an outstanding service compared to the conventional node B. In an NR system, all the user traffics may be serviced through a shared channel. Therefore, an NR system may require a device configured to collect state information, such as a buffer state, an available transmission power state, and a channel state of UEs, and perform scheduling, and the NR gNB 2c-10 may serve as the device. A single NR gNB 2c-10 may generally control a plurality of cells. In order to implement ultra-high speed data transfer compared to the current LTE, a NR system may employ a bandwidth larger than or equal to the current maximum bandwidth. In addition, the NR system may use, as a wireless access technology, an orthogonal frequency division multiplexing (OFDM) scheme, and additionally use a beamforming technology.

In addition, according to a part of embodiments, the NR gNB 2c-10 may employ an adaptive modulation and coding (hereinafter, referred to as AMC) scheme for determining a modulation scheme and a channel coding rate according to a channel state of a terminal. The NR CN 2c-05 may perform functions such as mobility support, bearer configuration, and QoS configuration. The NR CN 2c-05 is a device configured to perform various control functions as well as a mobility management function for a terminal, and may be connected to a plurality of base stations. In addition, the NR system may be linked to a conventional LTE system, and the NR CN is connected to an MME 2c-25 through a network interface. The MME may be connected to an eNB 2c-30 that is an existing base station.

Figure 2D:
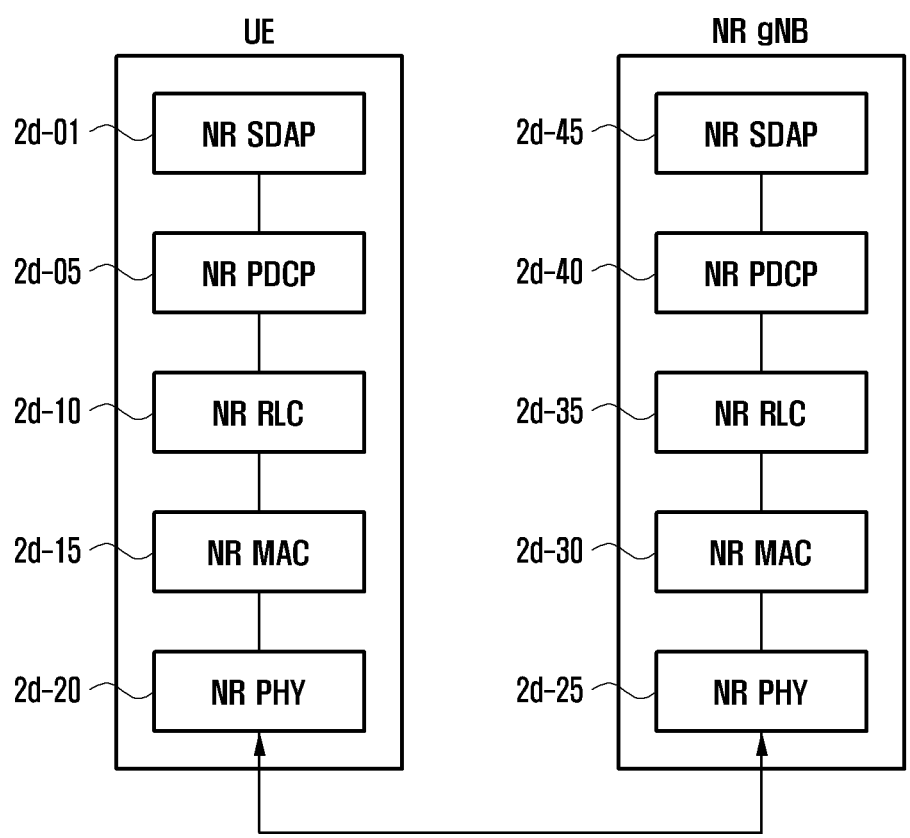
FIG. 2D illustrates a wireless protocol structure a next generation mobile communication system according to an embodiment of the disclosure.

FIG. 2D illustrates a wireless protocol structure a next generation mobile communication system according to an embodiment of the disclosure.

Referring to FIG. 2D, a wireless protocol of a next generation mobile communication system may include NR service data adaptation protocols (SDAPs) 2d-01 and 2d-45, NR PDCPs 2d-05 and 2d-40, NR RLCs 2d-10 and 2d-35, and NR MACs 2d-15 and 2d-30 of a terminal and an NR base station, respectively.

According to a part of embodiments, main functions of the NR SDAPs 2d-01 and 2d-45 may include a part of functions below. However, the functions are not limited to an example below.

Transfer of user data (transfer of user plane data)

Mapping between a QoS flow and a data bearer (DRB) for both downlink (DL) and uplink (UL)

Marking QoS flow ID in DL and UL (marking QoS flow ID in both DL and UL packets)

Mapping a reflective QoS flow to a data bearer with respect to UL SDAP PDUs (reflective QoS flow to DRB mapping for the UL SDAP PDUs)

In relation to an SDAP layer device, the terminal may receive a configuration relating to whether to use a function of the SDAP layer device or whether to use a header of the SDAP layer device for each PDCP layer device, each bearer, or each logical channel, through a radio resource control (RRC) message. In addition, if a SDAP header is configured, the SDAP layer device may instruct the terminal to update or reconfigure mapping information relating to a QoS flow and a data bearer for uplink and downlink, through a non-access stratum (NAS) quality of service (QoS) reflective configuration 1-bit indicator (NAS reflective QoS) and an access stratum (AS) QoS reflective configuration 1-bit indicator (AS reflective QoS) of the SDAP header. According to a part of embodiments, a SDAP header may include QoS flow ID information indicating QoS. According to a part of embodiments, QoS information may be used as data processing priority, scheduling information, etc. for supporting smooth service.

According to a part of embodiments, main functions of the NR PDCPs 2d-05 and 2d-40 may include a part of functions below. However, the functions are not limited to an example below.

Header compression and decompression (ROHC only)

Transfer of user data

In-sequence delivery (In-sequence delivery of upper layer PDUs)

Out-of-sequence delivery (Out-of-sequence delivery of upper layer PDUs)

Reordering (PDCP PDU reordering for reception)

Duplicate detection (Duplicate detection of lower layer SDUs)

Retransmission (Retransmission of PDCP SDUs)

Ciphering and deciphering

Timer-based SDU discard (Timer-based SDU discard in uplink)

In the description above, a reordering function of a NR PDCP device may mean reordering of PDCP PDUs received from a lower layer, according to an order based on a PDCP sequence number (SN). A reordering function of a NR PDCP device may include a function of transferring data to an upper layer according to a rearranged order, or may include a function of directly transferring data without considering order, may include a function of rearranging an order to record lost PDCP PDUs, may include a function of reporting the state of lost PDCP PDUs to a transmission side, and may include a function of requesting retransmission of lost PDCP PDUs.

According to a part of embodiments, main functions of the NR RLCs 2d-10 and 2d-35 may include a part of functions below. However the functions are not limited to an example below.

Data transfer (Transfer of upper layer PDUs)
In-sequence delivery (In-sequence delivery of upper layer PDUs)
Out-of-sequence delivery (Out-of-sequence delivery of upper layer PDUs)
ARQ (Error correction through ARQ)
Concatenation, segmentation and reassembly (Concatenation, segmentation and reassembly of RLC SDUs)
Re-segmentation (Re-segmentation of RLC data PDUs)
Reordering (Reordering of RLC data PDUs)
Duplicate detection
Error detection (Protocol error detection)
RLC SDU discard
RLC re-establishment In the above description, an in-sequence delivery function of a NR RLC device may mean a function of transferring RLC SDUs received from a lower layer, to an upper layer according to an order. An in-sequence delivery function of a NR RLC device may include a function of, if a single RLC SDU is divided into several RLC SDUs and then the RLC SDUs are received, reassembling the several RLC SDUs and transmitting the reassembled RLC SDUs.

An in-sequence delivery function of a NR RLC device may include a function of rearranging received RLC PDUs with reference to a RLC sequence number (SN) or a PDCP sequence number (SN), may include a function of rearranging an order to record lost RLC PDUs, may include a function of reporting the state of lost RLC PDUs to a transmission side, and may include a function of requesting retransmission of lost RLC PDUs.

An in-sequence delivery function of a NR RLC device may include a function of, if there is a lost RLC SDU, only transferring RLC SDUs before the lost RLC SDU to an upper layer according to an order.

An in-sequence delivery function of a NR RLC device may include a function of, although there is a lost RLC SDU, if a predetermined timer is expired, transferring, all the RLC SDUs received before the timer has started, to an upper layer according to an order.

An in-sequence delivery function of a NR RLC device may include a function of, although there is a lost RLC SDU, if a predetermined timer is expired, transferring, all the RLC SDUs received until the current time point, to an upper layer according to an order.

An NR RLC device may process RLC PDUs according to an order in which the RLC PDUs have been received, regardless of an order based on a sequence number (out-of sequence delivery), and transfer the processed RLC PDUs to an NR PDCP device.

In a case of segment reception of an NR RLC device, the NR RLC device may receive segments that have been stored in a buffer or are to be received later, reconfigure the segments into a single intact RLC PDU, and transfer the RLC PDU to an NR PDCP device.

An NR RLC layer may not include a concatenation function, and a function in an NR MAC layer may be performed or the concatenation function may be replaced with a multiplexing function of an NR MAC layer.

In the above description, an out-of-sequence delivery function of a NR RLC device may mean a function of directly transferring RLC SDUs received from a lower layer, to an upper layer regardless of an order. An out-of-sequence delivery function of a NR RLC device may include a function of, if a single RLC SDU is divided into several RLC SDUs and then the RLC SDUs are received, reassembling the several RLC SDUs and transmitting the reassembled RLC SDUs. An out-of-sequence delivery function of a NR RLC device may include a function of storing RLC SNs or PDCP SNs of received RLC PDUs and sequencing the RLC PDUs to record lost RLC PDUs.

According to a part of embodiments, the NR MACs 2d-15 and 2d-30 may be connected to several NR RLC layer devices configured in a single terminal, and main functions of an NR MAC may include a part of functions below. However, the functions are not limited to an example below.

Mapping (Mapping between logical channels and transport channels)
Multiplexing and demultiplexing (Multiplexing/demultiplexing of MAC SDUs)
Scheduling information reporting
HARQ (Error correction through HARQ)
Priority handling between logical channels (Priority handling between logical channels of one UE)
Priority handling between UEs (Priority handling between UEs by means of dynamic scheduling)
MBMS service identification
Transport format selection
Padding According to a part of embodiments, NR physical layers 2d-20 and 2d-25 may perform channel coding and modulation on upper layer data to make the data into an OFDM symbol and transmit the OFDM symbol through a wireless channel, or may demodulate and channel-decode an OFDM symbol received through a wireless channel, and then transfer the OFDM symbol to an upper layer.

Figure 2E:
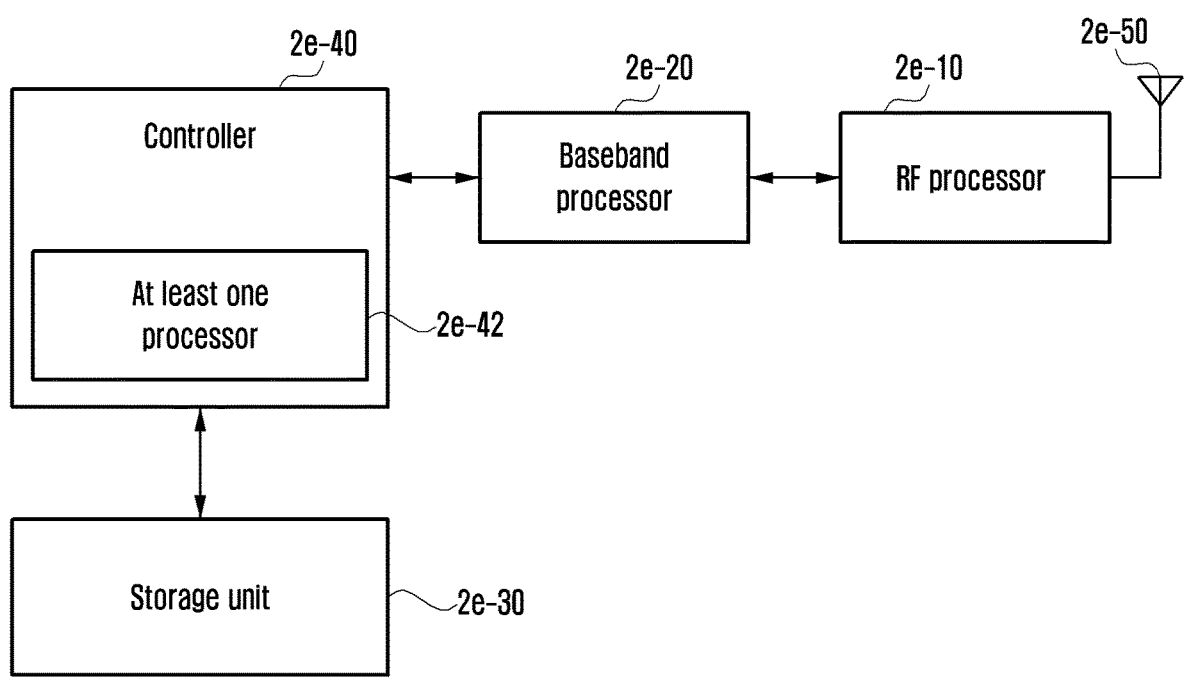
FIG. 2E is a block diagram illustrating an internal structure of a terminal according to an embodiment of the disclosure.

FIG. 2E is a block diagram illustrating an internal structure of a terminal employing according to an embodiment of the disclosure.

Referring to FIG. 2E, a terminal may include a radio frequency (RF) processor 2e-10, a baseband processor 2e-20, a storage unit 2e-30, and a controller 2e-40. However, the disclosure is not limited to the example described above, and a terminal may include a smaller or larger number of elements, compared to the elements illustrated in FIG. 2E.

The RF processor 2e-10 may perform a function, such as signal band change, amplification, etc., for transmitting or receiving the signal through a wireless channel That is, the RF processor 2e-10 may up-convert a baseband signal provided from the baseband processor 2e-20, into an RF band signal, and then transmit the RF band signal through an antenna 2e-50, and may down-convert an RF band signal received through the antenna 2e-50, into a baseband signal. For example, the RF processor 2e-10 may include a transmission filter, a reception filter, an amplifier, a mixer, an oscillator, a digital-to-analog converter (DAC), an analog-to-digital converter (ADC), and the like. The disclosure is not limited to the example described above. In FIG. 2E, only one antenna 2e-50 is illustrated, but the terminal may include a plurality of antennas. Furthermore, the RF processor 2e-10 may include a plurality of RF chains. Furthermore, the RF processor 2e-10 may perform beamforming.

To perform beamforming, the RF processor 2e-10 may adjust the phase and size of each of signals transmitted or received through a plurality of antennas or antenna elements. In addition, the RF processor 2e-10 may perform multi input multi output (MIMO), and may receive several layers at the time of performing a MIMO operation.

The baseband processor 2e-20 performs a function of conversion between a baseband signal and a bit stream according to a physical layer protocol of a system. For example, when data is transmitted, the baseband processor 2e-20 generates complex symbols by encoding and modulating a transmission bit stream. In addition, when data is received, the baseband processor 2e-20 reconstructs a reception bit stream by demodulating and decoding a baseband signal provided from the RF processor 2e-10. For example, in a case where an orthogonal frequency division multiplexing (OFDM) scheme is applied, when data is transmitted, the baseband processor 2e-20 generates complex symbols by encoding and modulating a transmission bit stream, maps the complex symbols to subcarriers, and then configures OFDM symbols through inverse fast Fourier transform (IFFT) calculation and cyclic prefix (CP) insertion. In addition, when data is received, the baseband processor 2e-20 may divide a baseband signal provided from the RF processor 2e-10, by the units of OFDM symbols, reconstruct signals mapped to subcarriers, through fast Fourier transform (FFT), and then reconstruct a reception bit stream through demodulation and decoding.

The baseband processor 2e-20 and the RF processor 2e-10 transmit and receive a signal as described above. The baseband processor 2e-20 and the RF processor 2e-10 may be called a transmitter, a receiver, a transceiver, or a communication unit. Furthermore, at least one of the baseband processor 2e-20 and the RF processor 2e-10 may include a plurality of communication modules to support a plurality of different wireless access technologies. In addition, at least one of the baseband processor 2e-20 and the RF processor 2e-10 may include different communication modules to process signals in different frequency bands. For example, different wireless access technologies may include wireless LAN (e.g. IEEE 802.11), cellular network (e.g. LTE), etc. Furthermore, different frequency bands may include a super high frequency (SHF) (e.g. 2.NRHz and NGHz) band, a millimeter (mm) wave (e.g. 60 GHz) band, etc. The terminal may transmit or receive a signal to or from a base station by using the baseband processor 2e-20 and the RF processor 2e-10, and the signal may include control information and data.

The storage unit 2e-30 stores data such as a basic program, an application program, and configuration information for an operation of the terminal. Particularly, the storage unit 2e-30 may store information relating to a second access node that performs wireless communication by using a second wireless access technology. The storage unit 2e-30 provides stored data in response to a request of the controller 2e-40. The storage unit 2e-30 may include a storage medium such as ROM, RAM, hard disk, CD-ROM, and DVD, or a combination of storage mediums. In addition, the storage unit 2e-30 may include a plurality of memories.

The controller 2e-40 controls overall operations of the terminal. For example, the controller 2e-40 transmits or receives a signal through the baseband processor 2e-20 and the RF processor 2e-10. Furthermore, the controller 2e-40 records and reads data in and from the storage unit 2e-30. To this end, the controller 2e-40 may include at least one processor 2e-42. For example, the controller 2e-40 may include a communication processor (CP) performing a control for communication, and an application processor (AP) controlling a higher layer, such as an application program. In addition, at least one element in the terminal may be implemented as a single chip.

Figure 2F:
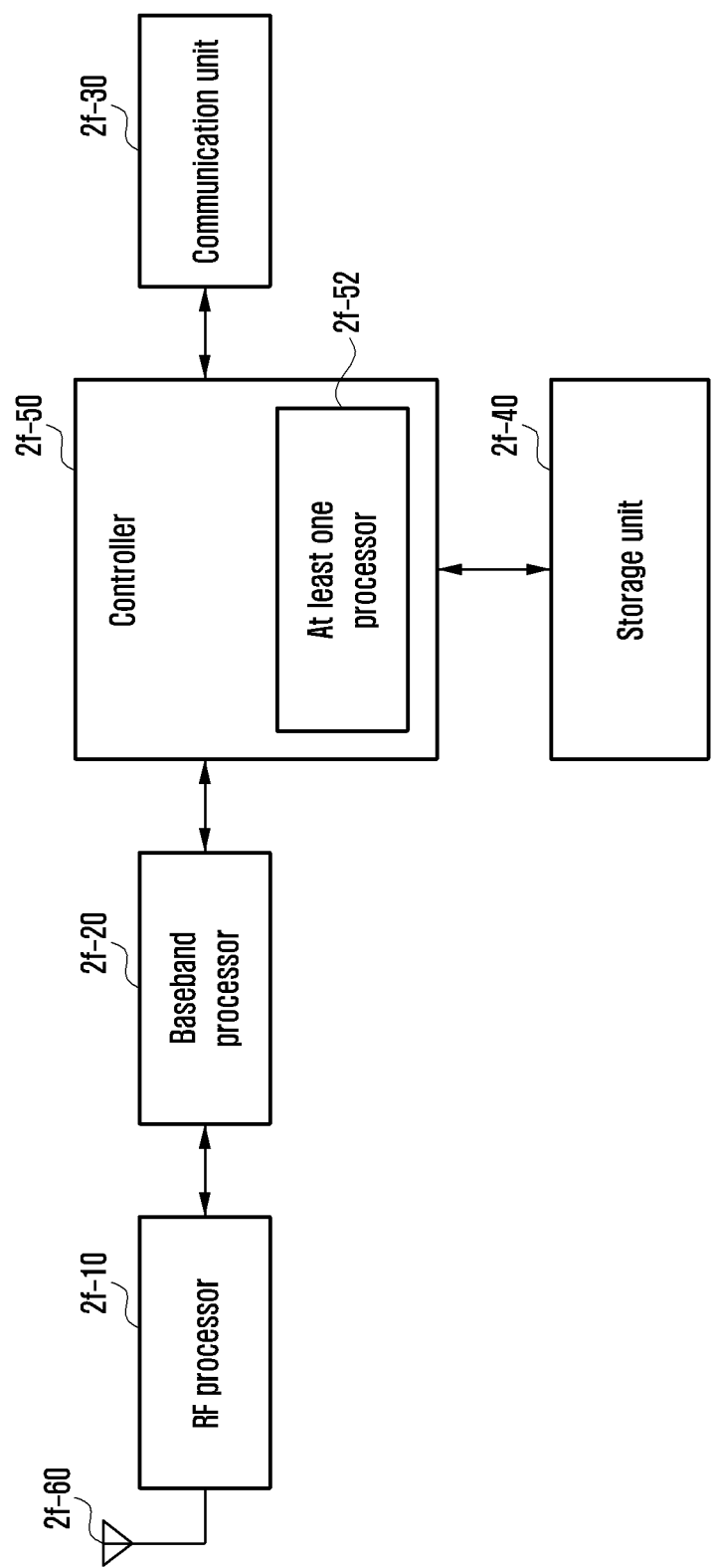
FIG. 2F is a block diagram illustrating a configuration of a NR base station according to an embodiment of the disclosure.

FIG. 2F is a block diagram illustrating a configuration of a NR base station according to an embodiment of the disclosure.

Referring to FIG. 2F, a base station may include an RF processor 2f-10, a baseband processor 2f-20, a backhaul communication unit 2f-30, a storage unit 2f-40, and a controller 2f-50. However, the disclosure is not limited to the example described above, and a base station may include a smaller or larger number of elements, compared to the elements illustrated in FIG. 2F.

The RF processor 2f-10 may perform a function, such as signal band change, amplification, etc., for transmitting or receiving a signal through a wireless channel That is, the RF processor 2f-10 may up-convert a baseband signal provided from the baseband processor 2f-20, into an RF band signal, and then transmit the RF band signal through an antenna 2f-60, and may down-convert an RF band signal received through the antenna 2f-60, into a baseband signal. For example, the RF processor 2f-10 may include a transmission filter, a reception filter, an amplifier, a mixer, an oscillator, a DAC, an ADC, and the like. In FIG. 2F, only one antenna 2f-60 is illustrated, but the RF processor 2f-10 may include a plurality of antennas. Furthermore, the RF processor 2f-10 may include a plurality of RF chains. Furthermore, the RF processor 2f-10 may perform beamforming. To perform beamforming, the RF processor 2f-10 may adjust the phase and size of each of signals transmitted or received through a plurality of antennas or antenna elements. The RF processor may perform a downlink MIMO operation by transmitting at least one layer.

The baseband processor 2f-20 performs a function of conversion between a baseband signal and a bit stream according to a physical layer protocol of a first wireless access technology. For example, when data is transmitted, the baseband processor 2f-20 generates complex symbols by encoding and modulating a transmission bit stream. In addition, when data is received, the baseband processor 2f-20 reconstructs a reception bit stream by demodulating and decoding a baseband signal provided from the RF processor 2f-10. For example, in a case where an OFDM scheme is applied, when data is transmitted, the baseband processor 2f-20 generates complex symbols by encoding and modulating a transmission bit stream, maps the complex symbols to subcarriers, and then configures OFDM symbols through IFFT calculation and CP insertion. In addition, when data is received, the baseband processor 2f-20 may divide a baseband signal provided from the RF processor 2f-10, by the units of OFDM symbols, reconstruct signals mapped to subcarriers, through FFT, and then reconstruct a reception bit stream through demodulation and decoding. The baseband processor 2f-20 and the RF processor 2f-10 may transmit and receive a signal as described above. Accordingly, the baseband processor 2f-20 and the RF processor 2f-10 may be called a transmitter, a receiver, a transceiver, a communication unit or a wireless communication unit. The base station may transmit or receive a signal to or from a terminal by using the baseband processor 2f-20 and the RF processor 2f-10, and the signal may include control information and data.

The backhaul communication unit 2f-30 provides an interface for performing communication with other nodes within a network. That is, the backhaul communication unit 2f-30 may convert, into a physical signal, a bit stream transmitted from a main base station to another node, for example, an auxiliary base station, a core network, etc., and may convert a physical signal received from another node, into a bit stream. The backhaul communication unit 2f-30 may be included in a communication unit.

The storage unit 2f-40 stores data such as a basic program, an application program, and configuration information for an operation of the base station. The storage unit 2f-40 may store information relating to a bearer assigned to a connected terminal, a measurement result reported from a connected terminal, etc. In addition, the storage unit 2f-40 may store information serving as a determination criterion of whether to provide or stop providing multi-connection to a terminal. The storage unit 2f-40 provides stored data in response to a request of the controller 2f-50. The storage unit 2f-40 may include a storage medium such as ROM, RAM, hard disk, CD-ROM, and DVD, or a combination of storage mediums. In addition, the storage unit 2f-40 may include a plurality of memories. According to a part of embodiments, the storage unit 2f-40 may store a program for performing a buffer state reporting method according to the disclosure.

The controller 2f-50 controls overall operations of the base station. For example, the controller 2f-50 transmits or receives a signal through the baseband processor 2f-20 and the RF processor 2f-10, or the backhaul communication unit 2f-30. Furthermore, the controller 2f-50 records and reads data in and from the storage unit 2f-40. To this end, the controller 2f-50 may include at least one processor 2f-52. In addition, at least one element in the base station may be implemented as a single chip.

Figure 2G:
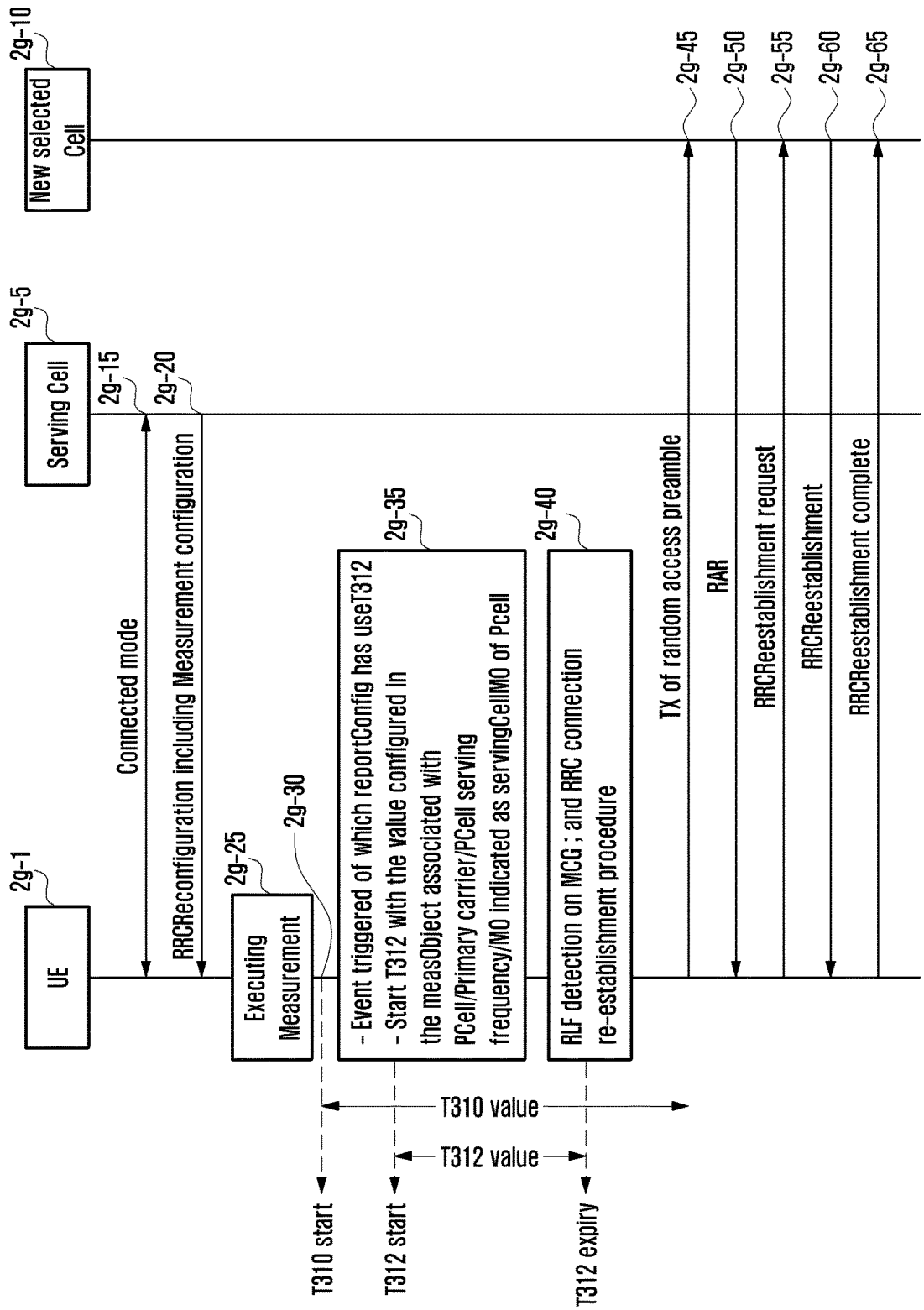
FIG. 2G illustrates expiration of a timer T312 according to an embodiment of the disclosure.

FIG. 2G illustrates expiration of a timer T312 according to an embodiment of the disclosure.

A terminal 2g-1 maintains a connection with a serving cell 2g-5 (2g-15). The serving cell may transmit an RRCReconfiguration message including a measurement configuration to the terminal (2g-20). In the measurement configuration, a reportConfig and a measObject may be grouped into one pair, to configure one measurement.

As the reportConfig, one among reportConfigs having the purposes of a periodic report, an event-based report, or a CGI report may be selected. In a case of an event-based report, the type of a corresponding event may be configured to be indicated by A1, A2, A3, A4, A5, and A6, and configuration values required for each type of event, for example, information such as an a1-Threshold, an a2-Threshold, an a3-Offset, an a4-Threshold, an a5-Threshold1, an a5-Threshold2, an a6-Offset, a reportOnLeave configuration, a hysteresis value, a timeToTrigger, a usewhiteCellList configuration, etc. may be configured for each type of event. In addition, the information may include a configuration value selecting an SSB or a CSI-RS as the type of a reference signal to be measured, a reporting interval configuration value, the number (reportAmount value) of available transmissions with respect to a triggered event, a unit (SINR/RSRP/RSRQ) of a cell measurement value to be included in an MR, a maximum number of non-serving cells which can be included at the time of including a measurement result in an MR, a unit of a measurement value at the time of including a measurement result for each beam in an MR, a maximum number of beams to be included at the time of including a measurement result for each beam in an MR, an indicator indicating whether to include a beam result, an indicator indicating whether to include a result of the best neighboring cell for each serving frequency, and an indicator indicating whether to use T312.

The measurement object may include information of an SSB frequency to be measured, SSB subcarrier spacing information, SSB measurement timing configuration information, CSI-RS frequency location information used at the time of measurement of a CSI-RS for cell signal strength, index information of a particular SSB or CSI-RS signal for cell signal strength measurement, beam-specific minimum strength information for an SSB or CSI-RS required for cell signal strength calculation, a minimum number of SSBs or CSI-RSs required for cell signal strength calculation, quantity configuration information to be applied at the time of a measurement, a Qoffset value to be applied to cells existing in an MO, information of a cell to be removed from and a cell to be added to a cell list, information of a cell to be removed from and a cell to be added to a black cell list, information of a cell to be removed from and a cell to be added to a white cell list, information of a frequency band in which a SSB or CSI-RS configured in an MO exists, information of a measurement period of a current Scell if the Scell is configured in a frequency in which an MO exists, and a timer T312 value to be used as a timer T312 value by the terminal if useT312 is configured in a reportConfig associated with an MO, and a corresponding measurement triggers an MR.

The terminal may perform the measurement at the moment of receiving the measurement configuration (2g-25). The terminal may start T312 if a condition below is satisfied. That is, T310 may operate with respect to a Pcell (2g-30). If an event of a measurement in which a measurement report is pre-configured, satisfies an entry condition during a timetotrigger interval, so that the measurement report is triggered, and useT312 is configured in a reportConfig in which the event is configured, the terminal may operate T312 (2g-35). A T312 value used at the time of the operation of T312 may be a T312 value configured in a measObject configured with a PCell, a primary carrier, a PCell serving frequency, or a servingCellMO of a PCell. If T312 is expired before expiration of T310, the terminal may declare radio link failure (RLF) to an MCG, and if AS security has not been activated, the terminal may put a release cause to be "other" and transition into RRC_IDLE. If AS security has been activated, but SRB 2 and at least one DRB have not been setup, the terminal may put a release cause to be "RRC connection failure" and transition into RRC_IDLE. In other cases, the terminal may perform a connection re-establishment procedure.

For another example, if the terminal performs a connection re-establishment procedure before expiration of T312 after operations (2g-15), (2g-20), (2g-25), (2g-30), and (2g-35), the terminal may stop T312.

An example of a connection re-establishment procedure may include cell selection, transmission of a random access preamble to a selected cell 2g-10 if the cell exists (2g-45), reception of an RAR from the cell (2g-50), transmission of an RRC re-establishment request message (2g-55), reception of an RRC re-establishment message from the cell (2g-60), and transmission of an RRC re-establishment complete message to the cell (2g-65).

Figure 2H:
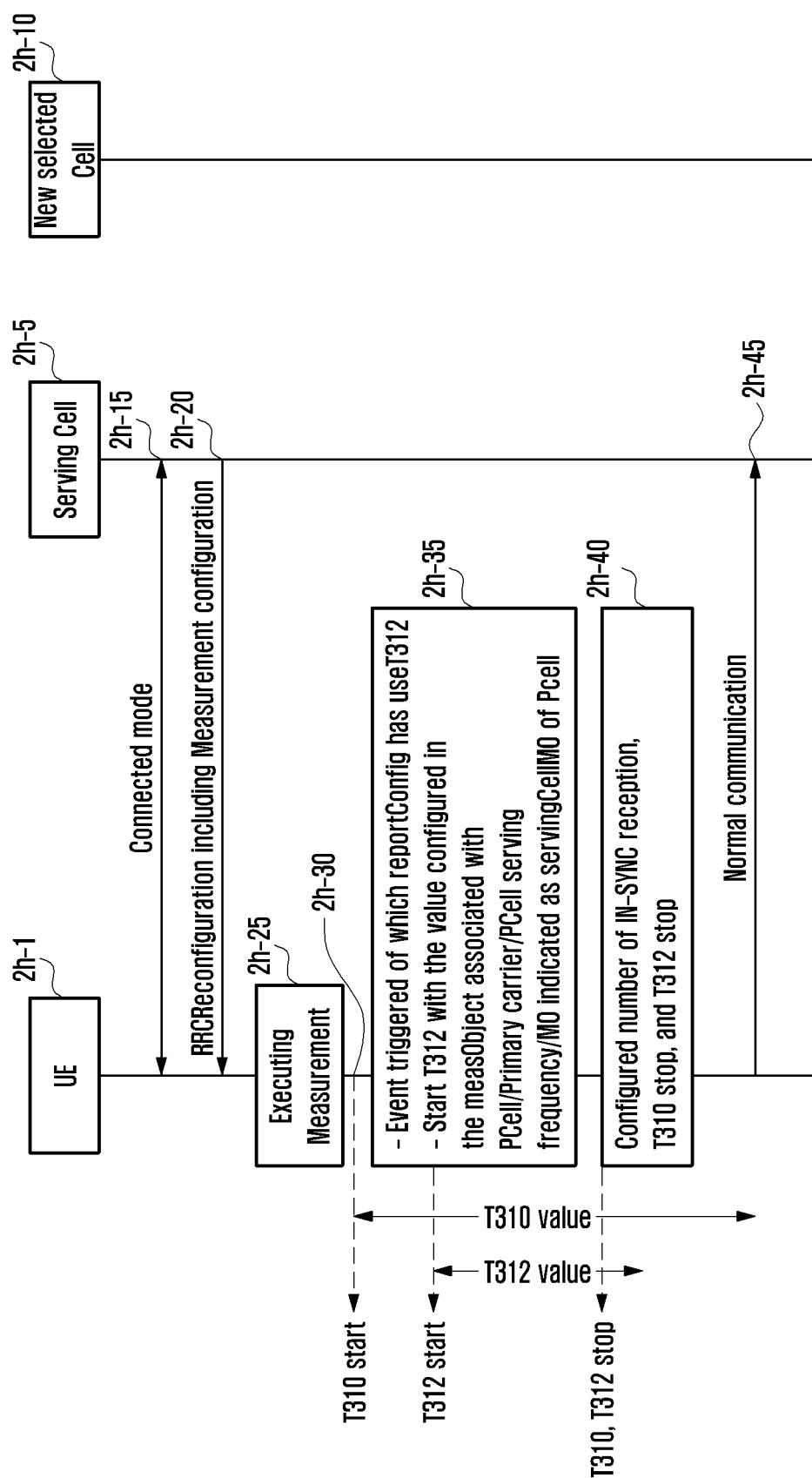
FIG. 2H illustrates a case where a timer T312 is expired due to expiration of a timer T310 according to an embodiment of the disclosure.

FIG. 2H illustrates a case where a timer T312 is expired due to expiration of a timer T310 according to an embodiment of the disclosure.

A terminal 2h-1 maintains a connection with a serving cell 2h-5 (2h-15). The serving cell may transmit an RRCReconfiguration message including a measurement configuration to the terminal (2h-20). In the measurement configuration, a reportConfig and a measObject may be grouped into one pair, to configure one measurement.

As the reportConfig, one among reportConfigs having the purposes of a periodic report, an event-based report, or a CGI report may be selected. In a case of an event-based report, the type of a corresponding event may be configured to be indicated by A1, A2, A3, A4, A5, and A6, and configuration values required for each type of event, for example, information such as an a1-Threshold, an a2-Threshold, an a3-Offset, an a4-Threshold, an a5-Threshold1, an a5-Threshold2, an a6-Offset, a reportOnLeave configuration, a hysteresis value, a timeToTrigger, a useWhiteCellList configuration, etc. may be configured for each type of event. In addition, the information may include a configuration value selecting an SSB or a CSI-RS as the type of a reference signal to be measured, a reporting interval configuration value, the number (reportAmount value) of available transmissions with respect to a triggered event, a unit (SINR/RSRP/RSRQ) of a cell measurement value to be included in an MR, a maximum number of non-serving cells which can be included at the time of including a measurement result in an MR, a unit of a measurement value at the time of including a measurement result for each beam in an MR, a maximum number of beams to be included at the time of including a measurement result for each beam in an MR, an indicator indicating whether to include a beam result, an indicator indicating whether to include a result of the best neighboring cell for each serving frequency, and an indicator indicating whether to use T312.

The measurement object may include information of an SSB frequency to be measured, SSB subcarrier spacing information, SSB measurement timing configuration information, CSI-RS frequency location information used at the time of measurement of a CSI-RS for cell signal strength, index information of a particular SSB or CSI-RS signal for cell signal strength measurement, beam-specific minimum strength information for an SSB or CSI-RS required for cell signal strength calculation, a minimum number of SSBs or CSI-RSs required for cell signal strength calculation, quantity configuration information to be applied at the time of a measurement, a Qoffset value to be applied to cells existing in an MO, information of a cell to be removed from and a cell to be added to a cell list, information of a cell to be removed from and a cell to be added to a black cell list, information of a cell to be removed from and a cell to be added to a white cell list, information of a frequency band in which a SSB or CSI-RS configured in the MO exists, information of a measurement period of a current S cell if the S cell is configured in a frequency in which an MO exists, and a timer T312 value to be used as a timer T312 value by the terminal if useT312 is configured in a reportConfig associated with an MO, and a corresponding measurement triggers an MR.

The terminal may perform the measurement at the moment of receiving the measurement configuration (2h-25). The terminal may start T312 if a condition below is satisfied. That is, T310 may operate with respect to a Pcell (2h-30). If an event of a measurement in which a measurement report is pre-configured, satisfies an entry condition during a timetotrigger interval, so that the measurement report is triggered, and useT312 is configured in a reportConfig in which the event is configured, the terminal may operate T312 (2h-35). A T312 value used at the time of the operation of T312 may be a T312 value configured in a measObject configured with a PCell, a primary carrier, a PCell serving frequency, or a servingCellMO of a PCell.

If T310 is stopped before expiration of T312, the terminal may stop a T312 operation. T310 may be stopped due to reception of N311 number of consecutive "in-sync" indications from a lower layer after T310 is started with respect to the Pcell (2h-40). After the stopping, the terminal may perform normal communication with the serving cell (2h-45).

Figure 2I:
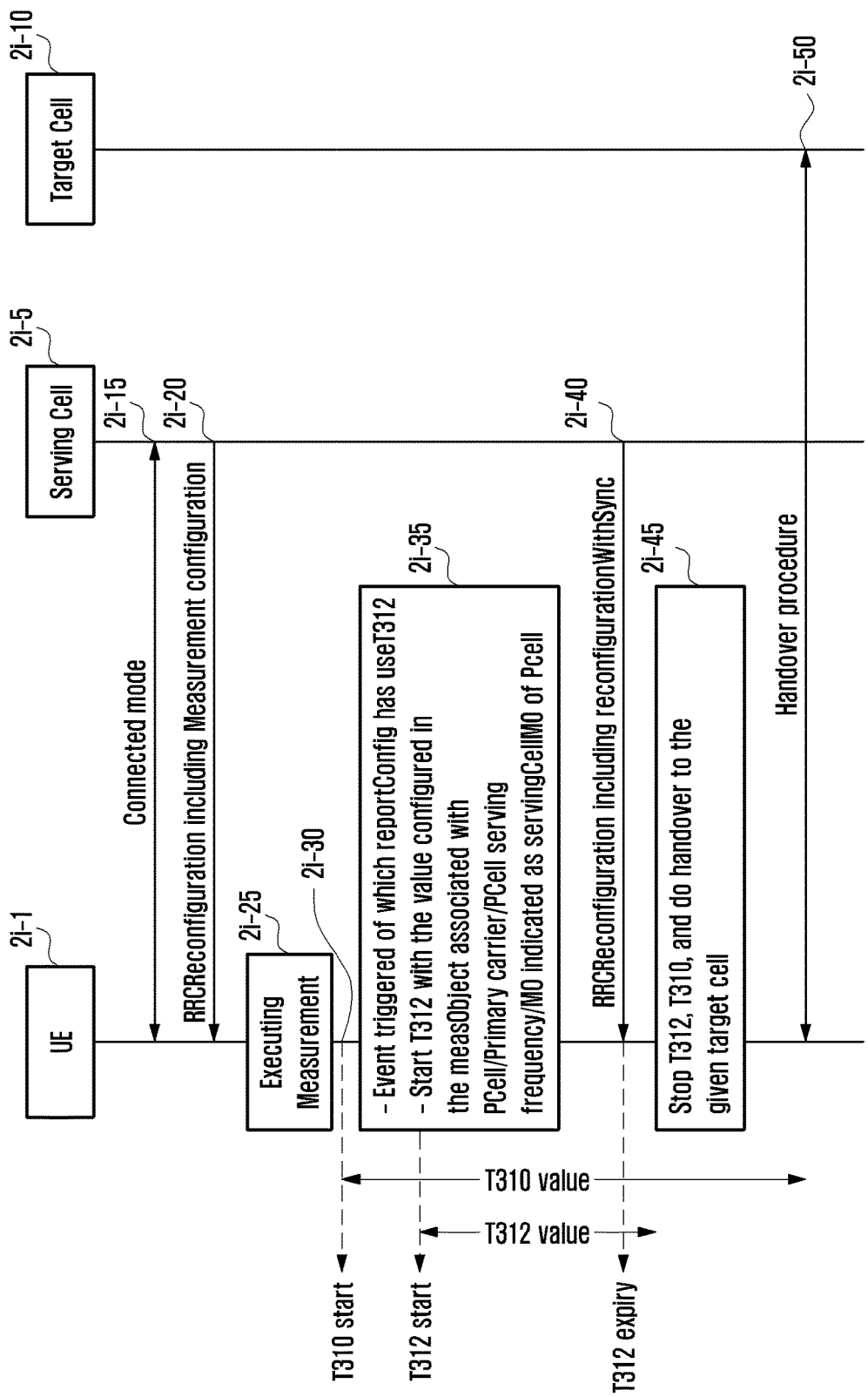
FIG. 2I illustrates a case of receiving a handover message before a timer T312 is expired according to an embodiment of the disclosure.

FIG. 2I illustrates a case of receiving a handover message before a timer T312 is expired according to an embodiment of the disclosure.

A terminal 2i-1 maintains a connection with a serving cell 2i-5 (2i-15). The serving cell may transmit a message including a measurement configuration to the terminal (2i-20). The message may be a RRCReconfiguration message. In the measurement configuration, a reportConfig and a measObject may be grouped into one pair, to configure one measurement.

As the reportConfig, one among reportConfigs having the purposes of a periodic report, an event-based report, or a CGI report may be selected. In a case of an event-based report, the type of a corresponding event may be configured to be indicated by A1, A2, A3, A4, A5, and A6, and configuration values required for each type of event, for example, information such as an a1-Threshold, an a2-Threshold, an a3-Offset, an a4-Threshold, an a5-Threshold1, an a5-Threshold2, an a6-Offset, a reportOnLeave configuration, a hysteresis value, a timeToTrigger, a useWhiteCellList configuration, etc. may be configured for each type of event. In addition, the information may include a configuration value selecting an SSB or a CSI-RS as the type of a reference signal to be measured, a reporting interval configuration value, the number (reportAmount value) of available transmissions with respect to a triggered event, a unit (SINR/RSRP/RSRQ) of a cell measurement value to be included in an MR, a maximum number of non-serving cells which can be included at the time of including a measurement result in an MR, a unit of a measurement value at the time of including a measurement result for each beam in an MR, a maximum number of beams to be included at the time of including a measurement result for each beam in an MR, an indicator indicating whether to include a beam result, an indicator indicating whether to include a result of the best neighboring cell for each serving frequency, and an indicator indicating whether to use T312.

The measurement object may include information of an SSB frequency to be measured, SSB subcarrier spacing information, SSB measurement timing configuration information, CSI-RS frequency location information used at the time of measurement of a CSI-RS for cell signal strength, index information of a particular SSB or CSI-RS signal for cell signal strength measurement, beam-specific minimum strength information for an SSB or CSI-RS required for cell signal strength calculation, a minimum number of SSBs or CSI-RSs required for cell signal strength calculation, quantity configuration information to be applied at the time of a measurement, a Qoffset value to be applied to cells existing in the MO, information of a cell to be removed from and a cell to be added to a cell list, information of a cell to be removed from and a cell to be added to a black cell list, information of a cell to be removed from and a cell to be added to a white cell list, information of a frequency band in which a SSB or CSI-RS configured in the MO exists, information of a measurement period of a current S cell if the S cell is configured in a frequency in which the MO exists, and a timer T312 value to be used as a timer T312 value by the terminal if useT312 is configured in a reportConfig associated with the MO, and a corresponding measurement triggers an MR.

The terminal may perform the measurement at the moment of receiving the measurement configuration (2i-25). The terminal may start T312 if a condition below is satisfied.

That is, T310 may operate with respect to a Pcell (2i-30). If an event of a measurement in which a measurement report is pre-configured, satisfies an entry condition during a time-totrigger interval, so that the measurement report is triggered, and useT312 is configured in a reportConfig in which the event is configured, the terminal may operate T312 (2i-35). A T312 value used at the time of the operation of T312 may be a T312 value configured in a measObject configured with a PCell, a primary carrier, a PCell serving frequency, or a servingCellMO of a PCell. Before expiration of T312, the terminal may receive a message including reconfigurationWithSync from the serving cell (2i-40). The message may be a RRCReconfiguration message or a handover command message. The terminal may stop T310 and T312 (2i-45). After the stopping, the terminal may perform a handover to a target cell through target cell information included in the received message (2i-50).

FIG. 2J illustrates a case of satisfying a leaving condition of an event during a timer T312 operation according to an embodiment of the disclosure.

A terminal 2j-1 maintains a connection with a serving cell 2j-5 (2j-15). The serving cell may transmit a message including a measurement configuration to the terminal (2j-20). The message may be a RRCReconfiguration message. In the measurement configuration, a reportConfig and a measObject may be grouped into one pair, to configure one measurement.

As the reportConfig, one among reportConfigs having the purposes of a periodic report, an event-based report, or a CGI report may be selected. In a case of an event-based report, the type of a corresponding event may be configured to be indicated by A1, A2, A3, A4, A5, and A6, and configuration values required for each type of event, for example, information such as an a1-Threshold, an a2-Threshold, an a3-Offset, an a4-Threshold, an a5-Threshold1, an a5-Threshold2, an a6-Offset, a reportOnLeave configuration, a hysteresis value, a timeToTrigger, a useWhiteCellList configuration, etc. may be configured for each type of event. In addition, the information may include a configuration value selecting an SSB or a CSI-RS as the type of a reference signal to be measured, a reporting interval configuration value, the number (reportAmount value) of available transmissions with respect to a triggered event, a unit (SINR/RSRP/RSRQ) of a cell measurement value to be included in an MR, a maximum number of non-serving cells which can be included at the time of including a measurement result in an MR, a unit of a measurement value at the time of including a measurement result for each beam in an MR, a maximum number of beams to be included at the time of including a measurement result for each beam in an MR, an indicator indicating whether to include a beam result, an indicator indicating whether to include a result of the best neighboring cell for each serving frequency, and an indicator indicating whether to use T312.

The measurement object may include information of an SSB frequency to be measured, SSB subcarrier spacing information, SSB measurement timing configuration information, CSI-RS frequency location information used at the time of measurement of a CSI-RS for cell signal strength, index information of a particular SSB or CSI-RS signal for cell signal strength measurement, beam-specific minimum strength information for an SSB or CSI-RS required for cell signal strength calculation, a minimum number of SSBs or CSI-RSs required for cell signal strength calculation, quantity configuration information to be applied at the time of a measurement, a Qoffset value to be applied to cells existing in the MO, information of a cell to be removed from and a cell to be added to a cell list, information of a cell to be removed from and a cell to be added to a black cell list, information of a cell to be removed from and a cell to be added to a white cell list, information of a frequency band in which a SSB or CSI-RS configured in the MO exists, information of a measurement period of a current S cell if the S cell is configured in a frequency in which the MO exists, and a timer T312 value to be used as a timer T312 value by the terminal if useT312 is configured in a reportConfig associated with the MO, and a corresponding measurement triggers an MR.

The terminal may perform the measurement at the moment of receiving the measurement configuration (2j-25). The terminal may start T312 if a condition below is satisfied. That is, T310 may operate with respect to a Pcell (2j-30). If an event of a measurement in which a measurement report is pre-configured, satisfies an entry condition during a time-totrigger interval, so that the measurement report is triggered, and useT312 is configured in a reportConfig in which the event is configured, the terminal may operate T312 (2j-35). A T312 value used at the time of the operation of T312 may be a T312 value configured in a measObject configured with a PCell, a primary carrier, a PCell serving frequency, or a servingCellMO of a PCell. If the terminal satisfies a leaving condition of the event having triggered the MR in operation 2j-35, during a timeToTrigger before expiration of T312, the terminal may stop T312 (2j-40). After the stopping, a normal operation may be performed (2j-45).

The followings show a specification of an embodiment and an example of ASN.1.

5.5.4 Measurement report triggering
5.5.4.1 General
If security has been activated successfully, the UE shall:
1> for each measId included in the measIdList within VarMeasConfig:
2> if the corresponding reportConfig includes a reportType set to eventTriggered or periodical;
3> if the corresponding measObject concerns NR;
4> if the eventA1 or eventA2 is configured in the corresponding reportConfig:
5> consider only the serving cell to be applicable;
4> if the eventA3 or eventA5 is configured in the corresponding reportConfig:
5> if a serving cell is associated with a measObjectNR and neighbors are associated with another measObjectNR, consider any serving cell associated with the other measObjectNR to be a neighboring cell as well;
4> for measurement events other than eventA1 or eventA2:
5> if useWhiteCellList is set to TRUE:
6> consider any neighboring cell detected based on parameters in the associated measObjectNR to be applicable when the concerned cell is included in the whiteCellsToAddModList defined within the VarMeasConfig for this measId;
5> else:
6> consider any neighboring cell detected based on parameters in the associated measObjectNR to be applicable when the concerned cell is not included in the blackCellsToAddModList defined within the VarMeasConfig for this measId;
3> else if the corresponding measObject concerns E-UTRA;
4> consider any neighboring cell detected on the associated frequency to be applicable when the concerned cell is not included in the blackCellsToAddModListEUTRAN defined within the VarMeasConfig for this measId;
2> else if the corresponding reportConfig includes a reportType set to reportCGI:
3> consider the cell detected on the associated measObject which has a physical cell identity matching the value of the cellForWhichToReportCGI included in the corresponding reportConfig within the VarMeasConfig to be applicable;
2> if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
3> include a measurement reporting entry within the VarMeasReportList for this measId;
3> set the numberOfReportsSent defined within the VarMeasReportList for this measId to 0;
3> include the concerned cell(s) in the cellsTriggeredList defined within the VarMeasReportList for this measId;
3> if the UE supports T312 and if useT312 is included for this event and if T310 for PCell is running:
4> if T312 is not running:
5> start timer T312 with the value configured in measObject associated with PCell;
3> initiate the measurement reporting procedure, as specified in 5.5.5;
2> else if the reportType is set to eventTriggered and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
3> set the numberOfReportsSent defined within the VarMeasReportList for this measId to 0;
3> include the concerned cell(s) in the cellsTriggeredList defined within the VarMeasReportList for this measId;
3> if the UE supports T312 and if useT312 is included for this event and if T310 for PCell is running:
4> if T312 is not running:
5> start timer T312 with the value configured in measObject associated with PCell;
3> initiate the measurement reporting procedure, as specified in 5.5.5;
2> else if the reportType is set to eventTriggered and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:
3> remove the concerned cell(s) in the cellsTriggeredList defined within the VarMeasReportList for this measId;
3> stop T312, if running
3> if reportOnLeave is set to TRUE for the corresponding reporting configuration:
4> initiate the measurement reporting procedure, as specified in 5.5.5;
3> if the cellsTriggeredList defined within the VarMeasReportList for this measId is empty:
4> remove the measurement reporting entry within the VarMeasReportList for this measId;
4> stop the periodical reporting timer for this measId, if running;
2> if reportType is set to periodical and if a (first) measurement result is available:
3> include a measurement reporting entry within the VarMeasReportList for this measId;
3> set the numberOfReportsSent defined within the VarMeasReportList for this measId to 0;
3> if the reportAmount exceeds 1:
4> initiate the measurement reporting procedure, as specified in 5.5.5, immediately after the quantity to be reported becomes available for the NR SpCell;
3> else (i.e. the reportAmount is equal to 1):
4> initiate the measurement reporting procedure, as specified in 5.5.5, immediately after the quantity to be reported becomes available for the NR SpCell and for the strongest cell among the applicable cells;
2> upon expiry of the periodical reporting timer for this measId:
3> initiate the measurement reporting procedure, as specified in 5.5.5.
2> if reportType is set to reportCGI;
3> if the UE acquired the SIB1 or SystemInformationBlockType1 for the requested cell; or
3> if the UE detects that the requested NR cell is not transmitting SIB1 (see TS 38.213 [13], clause 13):
4> stop timer T321;
4> include a measurement reporting entry within the VarMeasReportList for this measId;
4> set the numberOfReportsSent defined within the VarMeasReportList for this measId to 0;
4> initiate the measurement reporting procedure, as specified in 5.5.5;
2> upon the expiry of T321 for this measId:
3> include a measurement reporting entry within the VarMeasReportList for this measId;
3> set the numberOfReportsSent defined within the VarMeasReportList for this measId to 0;
3> initiate the measurement reporting procedure, as specified in 5.5.5.

Figure 2K:
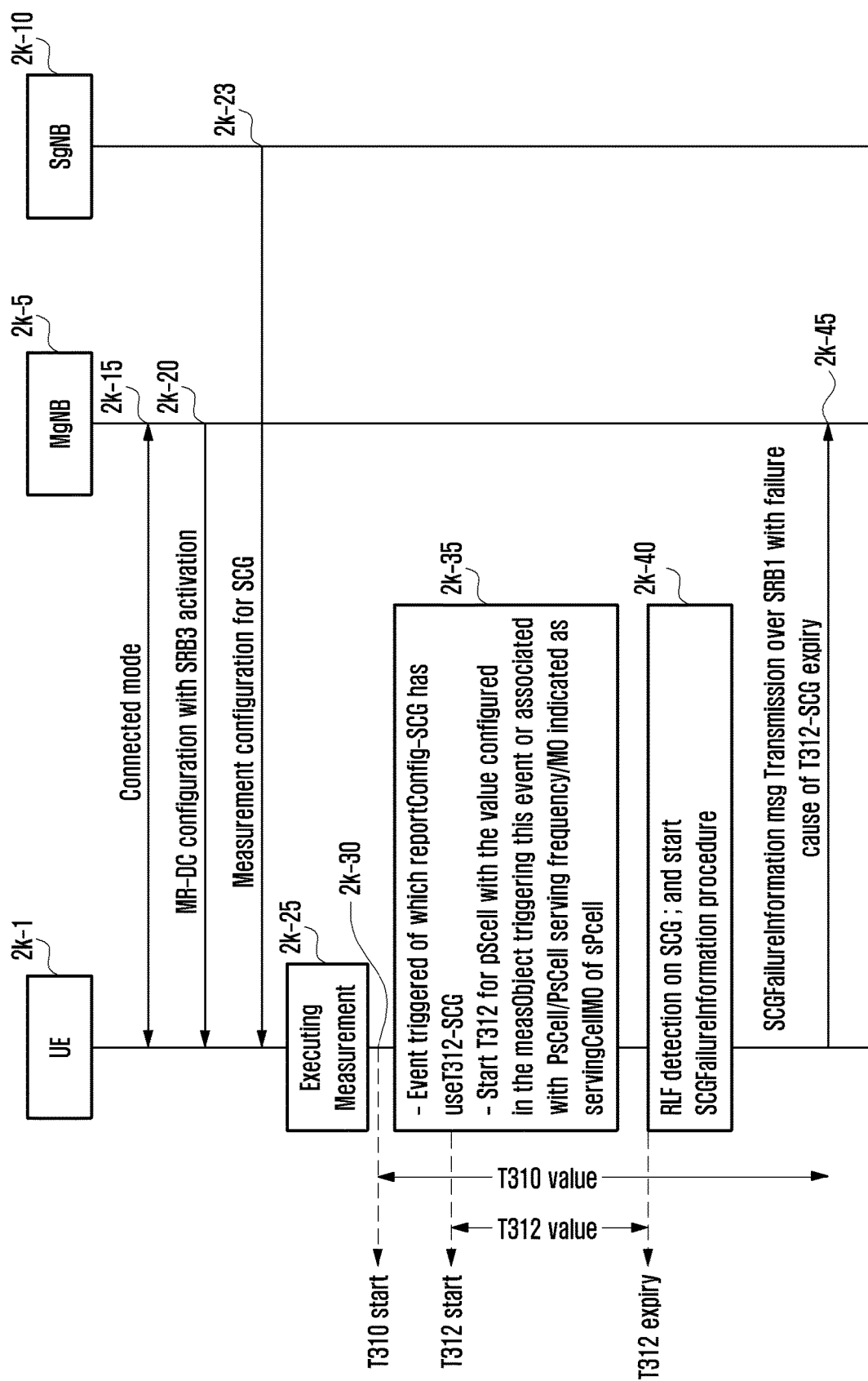
FIG. 2K illustrates, as one of other embodiments of the patent, management at a time of a T312 application to a SCG according to whether a SRB3 is configured, in a case where a terminal is configured with MR-DC according to an embodiment of the disclosure.

FIG. 2K illustrates, as one of other embodiments of the patent, management at a time of a T312 application to a SCG according to whether a SRB3 is configured, in a case where a terminal is configured with MR-DC according to an embodiment of the disclosure.

A terminal 2k-1 maintains a connection with a MgNB 2k-5 (2k-15). The terminal 2k-1 may be configured with MR-DC by a mater node (MN) 2k-5, and a SRB3 may be configured (2k-20). Otherwise, a measurement report and a handover command for an SCG may be configured to be transmitted to the SRB3.

An SgNB 2k-10 may configure useT312 in a particular reportconfiguration among measurement configurations for the SCG (2k-23). In addition, the SgNB may configure a T312 value in a measurement object among the measurement configurations. The reportConfig in which useT312 is configured, and the measurement object in which the T312 value is configured, may mean a measurement as a pair. The terminal having received the configuration may perform a corresponding measurement (2k-25).

T310 configured in a current Pscell may be started (2k-30). If an event of a measurement, among measurements configured to be measured in the SCG by the terminal, which has a reportConfig indicated with useT312, satisfies an entry condition during a timetotrigger, so that the measurement report is triggered, the terminal may operate T312 for the Pscell. The value of T312 may be a T312 value configured in a measurement object having triggered the measurement report, or a T312 value configured in a measurement object configured with a frequency of the current Pscell, a Pscell serving frequency, or a servingCellMO of the Pscell (2*k*-35).

Under an assumption that the timer T312 has been already operated, the timer may be stopped in a case below.

The timer T312 may be stopped in a case of reception a reconfiguration message including a reconfigurationWithSync for the SCG or a SCG change command, in a case of recovery of a physical layer problem in the SCG, or in a case of consecutive reception of a predetermined number of IN-sync indications from a lower layer with respect to the Pscell. The timer T312 may be stopped in a case where the timer T310 configured in the Pscell is stopped.

Particularly, the timer may be stopped in a case where a reconfigurationWithSync for the SCG or a reconfiguration message including a SCG change command is received through SRB3.

If the started T312 value is expired, the terminal may recognize occurrence of SCG RLF (2*k*-40).

Accordingly, the terminal may stop the operated timer T310 configured in the Pscell. In addition, the terminal may perform an SCGFailureInformation procedure (2*k*-40). To this end, the terminal may transfer an SCGFailureInformation message to the MN 2*k*-5 by using SRB1. The message may include a failure report, and a failure cause added to the report may be T312 expiry for an SCG.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a first message including information related to a measurement;
   measuring measurement objects (MOs), based on the information related to the measurement; and
   transmitting, to the base station, a measurement report, based on the measuring, in case that a triggering event for transmission of the measurement report is satisfied,
   wherein the information related to the measurement includes measurement identities and reporting configuration,
   wherein the measurement report includes a measurement result on cells belonging to a first cell set and a measurement result on cells belonging to a second cell set, in case that the reporting configuration includes configuration information related to a neighboring cell measurement,
   wherein the first cell set is a set of serving cells configured with a servingCell measurement object (servingCellMO),
   wherein the second cell set is a set of non-serving cells, and
   wherein each of the non-serving cells is referenced with the servingCellMO.

2. The method of claim 1,
   wherein each of the second cells relates to measurement identities configured as a servingCellMO among MOs other than MO corresponding with a measurement identifier associated with the triggering event for transmission of the measurement report.

3. The method of claim 2, wherein the second cell has a highest measured reference signal received power (RSRP) for the cells corresponding to the measurement identities configured as the servingCellMO.

4. The method of claim 3, wherein the second cell has a highest measured reference signal received quality (RSRQ), in case that the RSRP measurement results are not available, and has a highest measured noise and interference ratio (SINR), in case that the RSRQ measurement results are not available.

5. The method of claim 1, wherein, in case that the reporting configuration does not include the configuration information related to a neighboring cell measurement, the measurement report includes only a measurement result on cells belonging to a first cell set.

6. A method performed by a base station in a wireless communication system, the method comprising:
   transmitting, to a terminal, a first message including information related to a measurement; and
   receiving, from the terminal, a measurement report,
   wherein the measurement report is configured based on measuring of measurement objects (MOs), performed by the terminal, based on the information related to the measurement in case that a triggering event for transmission of the measurement report is satisfied,
   wherein the information related to the measurement includes measurement identities and reporting configuration,
   wherein the measurement report includes a measurement result on cells belonging to a first cell set and a measurement result on cells belonging to a second cell set, in case that the reporting configuration includes configuration information related to a neighboring cell measurement,
   wherein the first cell set is a set of serving cells configured with a servingCell measurement object (servingCellMO),
   wherein the second cell set is a set of non-serving cells, and
   wherein each of the non-serving cells is referenced with the servingCellMO.

7. The method of claim 6,
   wherein each of the second cells relates to measurement identities configured as a servingCellMO among MOs other than MO corresponding with a measurement identifier associated with the triggering event for transmission of the measurement report.

8. The method of claim 7, wherein the second cell has a highest measured reference signal received power (RSRP) for the cells corresponding to measurement identities configured as the servingCellMO.

9. The method of claim 8, wherein the second cell has a highest measured reference signal received quality (RSRQ), in case that the RSRP measurement results are not available, and has a highest measured noise and interference ratio (SINR), in case that the RSRQ measurement results are not available.

10. The method of claim 6, wherein, in case that the reporting configuration does not include the configuration information related to a neighboring cell measurement, the measurement report includes only a measurement result on cells belonging to a first cell set.

11. A terminal comprising:
    a transceiver configured to transmit or receive at least one signal; and
    at least one processor operatively coupled with the transceiver, wherein the at least one processor is configured to:
  receive, from a base station, a first message including information related to a measurement,
  measure measurement objects (MOs), based on the information related to the measurement, and
  transmit, to the base station, a measurement report based on the measuring in case that a triggering event for transmission of the measurement report is satisfied,
wherein the information related to the measurement includes measurement identities and reporting configuration,
wherein the measurement report includes a measurement result on cells belonging to a first cell set and a measurement result on cells belonging to a second cell set, in case that the reporting configuration includes configuration information related to a neighboring cell measurement,
wherein the first cell set is a set of serving cells configured with a servingCell measurement object (servingCellMO),
wherein the second cell set is a set of non-serving cells, and
wherein each of the non-serving cells is referenced with the servingCellMO.

12. The terminal of claim 11,
wherein each of the second cells relates to measurement identities configured as a servingCellMO among MOs other than MO corresponding with a measurement identifier associated with the triggering event for transmission of the measurement report.

13. The terminal of claim 12, wherein the second cell has a highest measured reference signal received power (RSRP) for the cells corresponding to the identifier configured as the servingCellMO.

14. The terminal of claim 13, wherein the second cell has a highest measured reference signal received quality (RSRQ), in case that the RSRP measurement results are not available, and has a highest measured noise and interference ratio (SINR), in case that the RSRQ measurement results are not available.

15. The terminal of claim 11, wherein, in case that the reporting configuration does not include the configuration information related to a neighboring cell measurement, the measurement report includes only a measurement result on cells belonging to a first cell set.

16. A base station comprising:
a transceiver configured to transmit or receive at least one signal; and
at least one processor operatively coupled with the transceiver,
wherein the at least one processor is configured to:
  transmit, to a terminal, a first message including information related to a measurement, and
  receive, from the terminal, a measurement report,
wherein the measurement report is configured based on measuring of measurement objects (MOs), performed by the terminal, based on the information related to the measurement, in case that a triggering event for transmission of the measurement report is satisfied,
wherein the information related to the measurement includes measurement identities and reporting configuration,
wherein the measurement report includes a measurement result on cells belonging to a first cell set and a measurement result on cells belonging to a second cell set, in case that the reporting configuration includes configuration information related to a neighboring cell measurement,
wherein the first cell set is a set of serving cells configured with a servingCell measurement object (servingCellMO),
wherein the second cell set is a set of non-serving cells, and
wherein each of the non-serving cells is referenced with the servingCellMO.

17. The base station of claim 16,
wherein each of the second cells relates to measurement identities configured as a servingCellMO among MOs other than MO corresponding with a measurement identifier associated with the triggering event for transmission of the measurement report.

18. The base station of claim 17, wherein the second cell has a highest measured reference signal received power (RSRP) for the cells corresponding to the measurement identities configured as the servingCellMO.

19. The base station of claim 18, wherein the second cell has a highest measured reference signal received quality (RSRQ), in case that the RSRP measurement results are not available, and has a highest measured noise and interference ratio (SINR), in case that the RSRQ measurement results are not available.

20. The base station of claim 16, wherein, in case that the reporting configuration does not include the configuration information related to a neighboring cell measurement, the measurement report includes only a measurement result on cells belonging to a first cell set.

* * * * *